(12) United States Patent
Yamamoto

(10) Patent No.: US 10,507,780 B2
(45) Date of Patent: Dec. 17, 2019

(54) FIXING CLIP AND FIXING STRUCTURE FOR FIXING A MEMBER TO BE INSTALLED USING THE FIXING CLIP

(71) Applicant: TOYOTA JIDOSHA KABUSHIKI KAISHA, Toyota-shi, Aichi-ken (JP)

(72) Inventor: Kazuhito Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 523 days.

(21) Appl. No.: 15/066,284

(22) Filed: Mar. 10, 2016

(65) Prior Publication Data

US 2016/0280172 A1 Sep. 29, 2016

(30) Foreign Application Priority Data

Mar. 26, 2015 (JP) ................................. 2015-063982

(51) Int. Cl.
*B60R 21/20* (2011.01)
*F16B 2/22* (2006.01)
(Continued)

(52) U.S. Cl.
CPC ................ *B60R 21/20* (2013.01); *F16B 2/22* (2013.01); *F16B 5/0642* (2013.01); *F16B 19/1081* (2013.01); *F16B 21/065* (2013.01)

(58) Field of Classification Search
CPC .......... B60R 21/20; F16B 2/22; F16B 21/065; F16B 19/1081; F16B 5/0642
See application file for complete search history.

(56) References Cited

U.S. PATENT DOCUMENTS 3,203,304 A 8/1965 Rapata
4,085,651 A 4/1978 Koscik
(Continued)

FOREIGN PATENT DOCUMENTS

CN 1702337 A 11/2005
CN 1828071 A 9/2006
(Continued)

OTHER PUBLICATIONS

U.S. Appl. No. 15/066,639, filed Mar. 10, 2016 in the name of Yamamoto.

(Continued)

*Primary Examiner* — Robert Sandy
*Assistant Examiner* — Louis A Mercado
(74) *Attorney, Agent, or Firm* — Oliff PLC

(57) ABSTRACT

A fixing clip fixes a member to a body panel and includes a bushing and a lock pin. The bushing includes a head and a leg. The lock pin includes a load receiving portion including a load receiving surface which receives a part of a reaction force of a drawing-out load loaded on the fixing clip from a body panel, when the drawing-out load acts on the fixing clip from the member. The bushing includes a pressure receiving surface for receiving the part of the reaction force of the drawing-out load which the lock pin has received. The drawing-out load thus can be received by both the bushing and the lock pin. As a result, an endurability of the fixing clip against the drawing-out load is improved by an amount of the load which the lock pin shares, so that the drawing-out load can be increased.

12 Claims, 20 Drawing Sheets

(51) Int. Cl.
*F16B 5/06* (2006.01)
*F16B 19/10* (2006.01)
*F16B 21/06* (2006.01)

(56) References Cited

U.S. PATENT DOCUMENTS

| | | |
|---|---|---|
| 4,861,208 A | 8/1989 | Boundy |
| 4,874,276 A | 10/1989 | Iguchi |
| 4,878,791 A | 11/1989 | Kurihara et al. |
| 4,927,287 A | 5/1990 | Ohkawa et al. |
| 5,030,051 A | 7/1991 | Kaneko et al. |
| 5,375,954 A | 12/1994 | Eguchi |
| 6,196,756 B1 | 3/2001 | Leverger |
| 6,685,407 B1 | 2/2004 | Holzman et al. |
| 7,841,817 B2 | 11/2010 | Kawai |
| 8,297,646 B2 | 10/2012 | Aoki |
| 8,677,573 B2 | 3/2014 | Lee |
| 8,696,018 B2 | 4/2014 | Yamamoto |
| 9,850,933 B2 | 12/2017 | Miura |
| 10,036,410 B2 | 7/2018 | Lesecq |
| 2002/0094253 A1 | 7/2002 | Enomoto et al. |
| 2004/0049895 A1 | 3/2004 | Draggoo et al. |
| 2005/0062263 A1 | 3/2005 | Kawai et al. |
| 2006/0198714 A1 | 9/2006 | Lesecq |
| 2008/0014045 A1 | 1/2008 | Kawai |
| 2008/0031701 A1 | 2/2008 | Boubtane et al. |
| 2011/0197405 A1 | 8/2011 | Kato et al. |
| 2013/0257025 A1 | 10/2013 | Yamamoto |
| 2014/0341674 A1 | 11/2014 | Hirano |
| 2015/0132078 A1* | 5/2015 | Yamamoto ............ F16B 21/065 411/22 |

FOREIGN PATENT DOCUMENTS

| | | |
|---|---|---|
| DE | 102013205465 A1 | 10/2013 |
| EP | 2354569 A2 | 8/2011 |
| JP | H06-43317 U | 6/1994 |
| JP | 2005-047325 A | 2/2005 |
| JP | 2005-337312 A | 12/2005 |
| JP | 2006-161890 A | 6/2006 |
| JP | 2006-242379 A | 9/2006 |
| JP | 2008-020006 A | 1/2008 |
| JP | 2013-210018 A | 10/2013 |
| JP | 2014-020409 A | 2/2014 |
| JP | 2014-238109 A | 12/2014 |
| WO | 2014195784 A1 | 12/2014 |

OTHER PUBLICATIONS

Jan. 12, 2018 Office Action issued in U.S. Appl. No. 15/066,639.
Aug. 28, 2018 Office Action issued in U.S. Appl. No. 15/066,639.
Nov. 21, 2018 Advisory Action issued in U.S. Appl. No. 15/066,639.
Jan. 14, 2019 Office Action issued in U.S. Appl. No. 15/066,639.

* cited by examiner

FIXING CLIP AND FIXING STRUCTURE FOR FIXING A MEMBER TO BE INSTALLED USING THE FIXING CLIP

CROSS-REFERENCE TO RELATED APPLICATIONS

This application claims priority to Japanese Patent Application No. 2015-063982 filed on Mar. 26, 2015, the entire content of which is incorporated herein by reference.

BACKGROUND

The disclosure relates to a fixing clip and a fixing structure (or apparatus) for fixing a member to be installed using the fixing clip. The member to be installed is, for example, a curtain airbag.

Japanese Patent Publication 2014-020409 discloses a conventional fixing clip. The conventional fixing clip includes a bushing and a lock pin. After a leg of the bushing is inserted through a clip fixing aperture of a body panel, the lock pin is inserted into a space provided between paired engagement hooks formed at opposed portions of the leg of the bushing whereby the engagement hooks are prevented from being deformed toward a center axis line of the fixing clip. According to the structure, when an excessively large load is loaded on the fixing clip from a curtain airbag at such a time when a curtain airbag (i.e., the member to be installed) is deployed and expanded, the fixing clip is prevented from being drawn-out from the body panel.

However, with the conventional fixing clip, there are the following problems to be addressed:

The lock pin is a member used for preventing the engagement hooks from being deformed toward the center axis line of the fixing clip when a drawing-out load is loaded on the fixing clip from the member to be installed and the engagement hooks are pushed by the body panel. Therefore, the lock pin is not designed so as to be able to share the drawing-out load loaded on the fixing clip from the body panel. As a result, when the drawing-out load is loaded on the fixing clip from the member to be installed, an entirety of the drawing-out load is received by the engagement hooks, and is transmitted from the engagement hooks to the leg of the bushing, then is further transmitted through the leg of the bushing, and is finally received by the head of the bushing. If the load loaded on the leg exceeds an endurability of the leg, the leg will be broken at a connecting portion of the leg to the head and, as a result, the member to be installed will be disconnected and removed from the body panel. If a cross-sectional area of the leg is increased in order to prevent the leg from being broken at the connecting portion to the head, it will be difficult to cause the leg to pass through the clip fixing aperture. Therefore, there will be some limit in increasing the cross-sectional area of the leg from the viewpoint of fixing and removing the fixing clip to the body panel.

SUMMARY

An object of disclosed embodiments is to provide a fixing clip having a bushing (or bush) and a lock pin, improved in endurability against a drawing-out (or removal) load and a fixing structure for fixing a member to be installed using the fixing clip.

A fixing clip and a fixing structure for fixing a member to be installed using the fixing clip according to at least some aspects can include the following features, where reference numerals in brackets correspond to numerals shown in the accompanying drawings:

A fixing clip (10) according to a first aspect is for fixing a member (94) to a body panel (90) and includes a bushing (20) and a lock pin (50) to be inserted into the bushing (20). The bushing (20) includes a head (22) and a leg (30). The bushing (20) includes paired engagement hooks (40) provided at opposed portions (32) of the leg (30) located on opposite sides of a center axis line (12) of the fixing clip and opposing each other.

The lock pin (50) includes a load receiving portion (50, 52A, 52B, 52C) where, when a drawing-out load (F) is loaded on the fixing clip (10) from the member (94) and a reaction force of the drawing-out load (F) is applied to the fixing clip (10) from the body panel (90), the lock pin (50) receives a part of the reaction force of the drawing-out load (F).

The bushing (20) includes a pressure receiving surface (26) where the bushing (20) receives the part of the reaction force of the drawing-out load (F) which the lock pin (50) has received.

The first aspect is applicable to the first, second and third embodiments described later.

A second aspect includes the first aspect, wherein the pressure receiving surface (26) of the bushing (20), except for an end portion of the pressure receiving surface (26) located on a side closest to the center axis line (12) of the fixing clip and extending into the leg (30), is located inside the head (22) of the bushing (20).

The second aspect is applicable to the first, second and third embodiments described later.

A third aspect includes the first aspect, wherein the lock pin (50) includes a side hook (52A) which, in a state that the lock pin has been inserted into the bushing, protrudes more than a side surface of the leg (30) of the bushing (20) in a direction (Cr1) perpendicular to a direction (Cfr) connecting the paired engagement hooks (40) and perpendicular to the center axis line (12) of the fixing clip (10). The third aspect and the following fourth to tenth aspects are applicable to the first embodiment described later.

A fourth aspect includes the third aspect, wherein in a state that the lock pin (50) has been inserted into a space provided between the paired engagement hooks of the bushing (20), the side hook (52A) is located along a plane extending in the direction (Cr1) perpendicular to a direction (Cfr) connecting the paired engagement hooks (40) and perpendicular to the center axis line (12) of the fixing clip (10) and is located closer to a tip of the leg than a head-side end of the engagement hook (40).

A fifth aspect includes the third aspect, wherein the opposed portions (32) of the leg are connected to the head (22) at first ends of the opposed portions of the leg and extend in a direction away from the head (22) and end at second ends of the opposed portions. Each of the paired engagement hooks (40) is integrally formed to an outside surface of each of the opposed portions (32) of the leg. The head-side end of the engagement hook (40) is spaced from the head (22).

The fixing clip (10) engages the body panel (90) at the paired engagement hooks (40) when the drawing-out load (F) is loaded on the fixing clip from the member (94) and the fixing clip (10) has been inclined relative to the body panel (90) along a plane extending in the direction (Cfr) connecting the paired engagement hooks (40).

A sixth aspect includes the fifth aspect, wherein when the drawing-out load (F) is loaded on the fixing clip (10) from the member (94) so that the fixing clip (10) is inclined relative to the body panel (90) and engages the body panel (90) at a first engagement portion (42A) and a second engagement portion (44A) whose distances from the head (22) are different from each other, the first engagement portion (42A) is located closer to the head than the side hook (52A) and the second engagement portion (44A) is located closer to the tip of the leg than the side hook (52A).

A seventh aspect includes the third aspect, wherein the side hook (52A) includes an engagement surface (54) opposing the head (22) and a reinforcement rib (56) which rises toward the head from the engagement surface (54) and reinforces a root portion of the engagement surface (54).

An eighth aspect includes the third aspect, wherein a support surface (36) for preventing the side hook (52A) from being deformed toward the center axis line (12) of the fixing clip is formed at an inside surface of each of the opposed portions (32) of the leg (30).

A ninth aspect includes the third aspect, wherein the lock pin (50) includes a pair of arms (58) each having an outside surface where the side hook (52A) is formed, an arm connecting portion (60) rotatably connecting the pair of arms (58) in an opposing direction of the pair of arms (58), and tool inserting holes (62) formed at the pair of arms on opposite sides of the arm connecting portion (60).

A tenth aspect includes the third aspect, wherein a guide surface (28) is formed at an inside surface of each of the opposed portions (32) of the leg (30) of the bushing (20). The guide surface (28) is constructed from an inclined surface which is brought into sliding-contact with the lock pin (50) when the lock pin (50) is inserted into a deepest position of the bushing thereby enlarging a span between the pair of side hooks (52A) and moving the pair of side hooks to a position where the pair of side hooks can engage the body panel (90).

An eleventh aspect includes the first aspect, wherein the lock pin (50) includes a load receiving surface (52B, 52C) which is provided at a lock pin portion located along a plane extending in a direction (Cfr) connecting the paired engagement hooks (40) in a state that the lock pin (50) has been inserted into the bushing and is inclined so as to extend in a direction toward a tip of the leg (30) and away from the center axis line (12) of the fixing clip. The load receiving surface (52B, 52C) defines the load receiving portion (52).

The bushing (20) includes a pushing surface (48) formed at a bushing portion opposing the load receiving surface (52B, 52C) of the lock pin. The pushing surface (48) pushes the lock pin (50) toward the tip of the leg (30) at the load receiving surface (52B, 52C) when the fixing clip (10) receives the drawing-out load (F) from the member (94).

The eleventh aspect is applicable to the second and third embodiments described later.

A twelfth aspect includes the eleventh aspect, wherein the opposed portions (32) of the leg are connected to the head (22) at first ends of the opposed portions of the leg and extend in a direction away from the head to thereby end at second ends of the opposed portions. Each of the paired engagement hooks (40) is integrally formed at an outside surface of each of the opposed portions (32) of the leg. The head-side end of each of the paired engagement hooks (40) is spaced from the head (22).

The pushing surface (48) is provided at an inside surface of each of the opposed portions (32) of the leg.

The twelfth aspect is applicable to the second embodiment described later.

A thirteenth aspect includes the eleventh aspect, wherein each of the paired engagement hooks (40) of the leg is connected to each of the opposed portions (32) of the leg at a hook connecting portion (40a) and is separated from the leg (30) except at the hook connecting portion (40a). Each of the paired engagement hooks (40) extends toward the head (22) from the hook connecting portion (40a). The pushing surface (48) is provided at an inside surface of each of the paired engagement hooks (40).

The thirteenth aspect is applicable to the third embodiment described later.

A fixing structure (1) according to a fourteenth aspect is a structure for fixing a member (94) to a body panel (90) at a rectangular clip fixing aperture (92) and includes the fixing clip (10) according to the first aspect.

The fixing clip (10) is coupled to the body panel (90), so that a direction (Cr1) perpendicular to a direction (Cfr) connecting the paired engagement hooks (40) is parallel to a long axis of the rectangular clip fixing aperture (92).

In a normal operating condition of the member (94) where no drawing-out load (F) acts on the fixing clip (10) from the member (94), the center axis line (12) of the fixing clip (10) is perpendicular to the body panel (90), a clip fixing aperture (92)-defining rim of the body panel (90) is flat, and the clip fixing aperture (92)-defining rim of the body panel (90) and a tab (94a) of the member (94) are located between the head (22) and the paired engagement hooks (40) of the bushing (20).

In a condition where the drawing-out load (F) generating a moment at a root (30a) of the leg (30) acts on the fixing clip (10) from the member (94), the fixing clip (10) is inclined about the long axis of the clip fixing aperture (92), and at least a portion of the clip fixing aperture (92)-defining rim of the body panel (90) is plastically deformed so as to protrude in a drawing-out load acting direction. The fourteenth aspect is applicable to the first, second and third embodiments described later.

According to the first aspect, the following technical advantages are obtained:

Since the load receiving portion is provided at the lock pin whereby the lock pin can receive a part of the reaction force of the drawing-out load, when the drawing-out load is loaded on the fixing clip from the member to be installed, the reaction force of the drawing-out load can be received by both of the bushing and the lock pin. As a result, the endurability of the fixing clip against a drawing-out load can be improved relative to that of the conventional fixing clip by an amount of the load which the lock pin shares, so that the drawing-out load which the fixing clip receives can be increased.

According to the second aspect, since the bushing includes the pressure receiving surface, the bushing can receive the load which the lock pin has received, at the head without or substantially without passing through the leg of the bushing. As a result, an amount of the load transmitted through the leg of the bushing can be decreased, so that the bushing can be prevented from being broken at the leg.

According to the third aspect, since the side hook is provided to the lock pin and the side hook operates as the load receiving portion, a part of the drawing-out load reaction force from the body panel can be received directly by the lock pin. The bushing can receive at the head the load which the lock pin has received without passing via the leg and the engagement hook of the bushing. As a result, a load loaded on the leg and the engagement hook of the bushing can be decreased. Further, since the load is transmitted not through the leg and the engagement hook of the bushing but through the lock pin, a load transmittance route from the load receiving portion to the pressure receiving surface can be simplified.

According to the fourth aspect, since the side hook is located in the plane extending in the direction perpendicular to the direction connecting the paired engagement hooks, a body panel portion with which the side hock engages resists against being enlarged resulting in that the side hook can sufficiently bear a large load. Further, since the side hook is located closer to the tip of the leg than the head-side end of the engagement hook, when the drawing-out load is loaded on the fixing clip so that the fixing clip is inclined relative to the body panel, the load is also loaded on the side clip so that the drawing-out load loaded on the fixing clip from the member to be installed can be shared and received by the side hook and the engagement hook in a good balance.

According to the fifth aspect, since the fixing clip engages the body panel at a state inclined relative to the body panel when the drawing-out load is loaded on the fixing clip from the member to be installed, a tension force and a bending moment added to the leg can be smaller than those added in a case where the fixing clip engages the body panel at a state perpendicular to the body panel. As a result, the bushing is suppressed from being broken at the leg, and the fixing clip can be improved in its ability of enduring the drawing-out load.

According to the sixth aspect, since the first engagement portion is located closer to the head than the side hook and the second engagement portion is located closer to the tip of the leg than the side hook, the side hook and the first and second engagement portions can receive the reaction force of the drawing-out load from the body panel at a good balance.

Further, since an energy is absorbed when the engagement hook on the side of the second engagement portion is shaved by an inside edge of the clip fixing aperture-defining rim of the body panel, breakage of the engagement hook on the side of the second engagement portion or breakage of the root portion of the leg where the engagement hock on the side of the second engagement portion is formed can be suppressed.

According to the seventh aspect, since the root portion of the engagement surface of the side hook is reinforced directly by the reinforcing rib, the side hook is suppressed from being broken at a corner of the root portion of the engagement surface due to a bending tensile stress when the reaction force of the drawing-out load is added to the engagement surface from the body panel.

Further, in a case where the body panel is constructed of a thin plate, an engagement hock-hanging portion of the clip fixing aperture defining-rim of the body panel is likely deformed at a relatively low load so that the fixing clip is easily inclined relative to the body panel. However, in the embodiment, since the reinforcing rim is formed at the side hook, when the clip fixing aperture defining-rim of the body panel is enlarged by the reinforcing rib at a position located in the direction perpendicular to the direction connecting the paired engagement hooks, the clip fixing aperture defining-rim of the body panel resists against being enlarged. As a result, inclination of the fixing clip relative to the body panel and deformation of the body panel are suppressed.

Further, when the fixing clip is increased in inclination relative to the body panel, an outside surface to the reinforcing rib slide-contacts an inside surface of the clip fixing aperture defining-rim of the body panel with friction whereby an energy is absorbed. As a result, a speed and a shock with which the engagement surface of the side hook collides against the body panel are decreased.

According to the eighth aspect, since the support surface supports the side hook from inside of the side hook at the inside surface of the leg, when the load is loaded on the side hook, the side hook is prevented from escaping and being deformed toward the tip of the leg and the center axis line of the fixing clip. As a result, the side hook can sufficiently support the load.

According to the ninth aspect, the tool inserting hole is provided to the lock pin. As a result, by inserting tip portions of a certain tool like radio pinchers into the tool inserting holes of the fixing clip, gripping grips of the tool and decreasing a distance between the grips so that the side hooks are moved inside the space between the opposed portions of the leg, and then pulling the grips, the lock pin can be moved to a predetermined position in the lock pin inserting hole in a lock pin drawing direction. Holding the state that the lock pin has been moved to the predetermined position in the lock pin inserting hole, the bushing is pulled by hand or the tool, so that the paired engagement hooks are pushed by the inside surface of the clip fixing aperture defining-rim of the body panel and are moved toward the center axis line of the fixing clip. As a result, the engagement hooks can pass through the clip fixing aperture and the fixing clip can be removed from the body panel, whereby handling at the time of service is improved.

According to the tenth aspect, since the guide surface is formed at the inside surface of each of the opposed portions of the leg, when the lock pin is pushed into the deepest position of the bushing, a span between the pair of side hooks can be surely enlarged so that the pair of side hooks can engage the body panel.

According to the eleventh aspect, the load receiving portion is constructed from the load receiving surface which is formed at the lock pin and is inclined so as to extend in the direction toward the tip of the leg and away from the center axis line of the fixing clip. When the drawing-out load is loaded on the fixing clip from the body panel, the reaction force of the drawing-out load added to the engagement hook from the body panel deforms the engagement hook which in turn pushes the load receiving surface. As a result, a part of the drawing-out load can be received by the load receiving surface of the lock pin. Since the load transmitting route from the load receiving surface of the lock pin to the pressure receiving surface of the bushing passes through the lock pin and does not pass the leg of the bushing, the load loaded on the leg of the bushing and, especially loaded on the root of the leg, is not increased so that the bushing is suppressed from being broken at the root of the leg.

According to the twelfth aspect, the same technical advantages as those of the eleventh aspect can be obtained with the fixing clip having the engagement hook integrally formed at the leg and extending in the direction from the side of the head toward the side of the tip of the leg.

According to the thirteenth aspect, the same technical advantages as those of the eleventh aspect can be obtained with the fixing clip having the engagement hook separated from the leg except the hook connecting portion and extending in the direction from the side of the tip of the leg toward the side of the head.

According to the fourteenth aspect, since the member to be installed is fixed to the body panel using the fixing clip according to any one of the first to thirteenth aspects increased in endurability against the drawing-out load, the fixing clip is unlikely to be drawn-out from the body panel when the drawing-out load is loaded on the fixing clip from the member to be installed. As a result, the fixing structure can be improved in reliability in strength.

BRIEF DESCRIPTION OF THE DRAWING

The above and other objects, features, and technical advantages of the disclosed embodiments will become more apparent and will be more readily appreciated from the following detailed description of the preferred embodiments in conjunction with the accompanying drawings, in which.

DETAILED DESCRIPTION OF PREFERRED EMBODIMENTS

Figure 1:
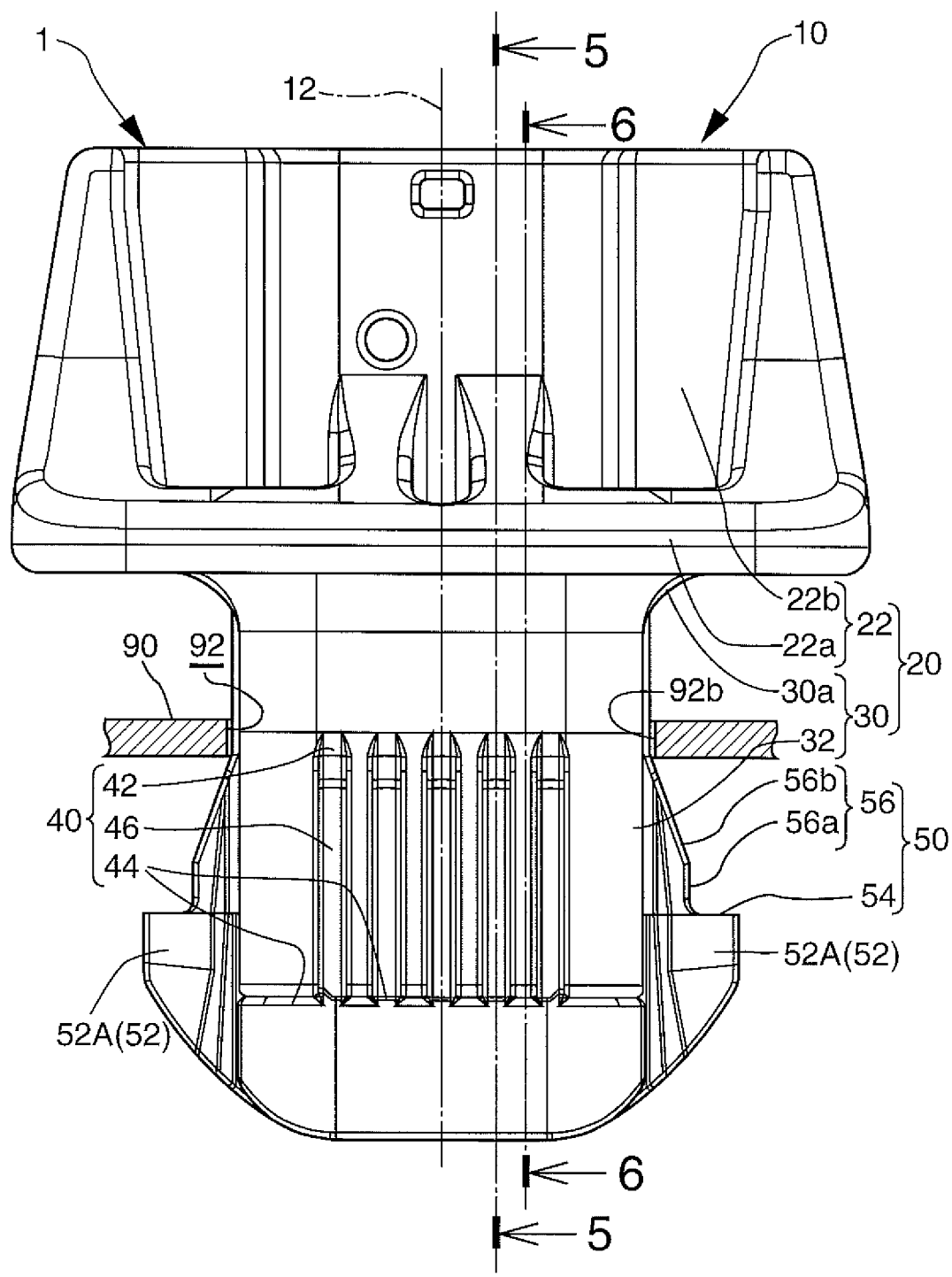
FIG. 1 is a front view of a fixing clip according to a first embodiment and a fixing structure for fixing a member to be installed using the fixing clip.

A fixing clip 10 according to an embodiment and a fixing structure 1 (Reference Numeral "1 is shown in FIGS. 1, 2, 18 and 20) for fixing a member to be installed using the fixing clip 10 will be explained with reference to FIGS. 1-20.

Figure 18:
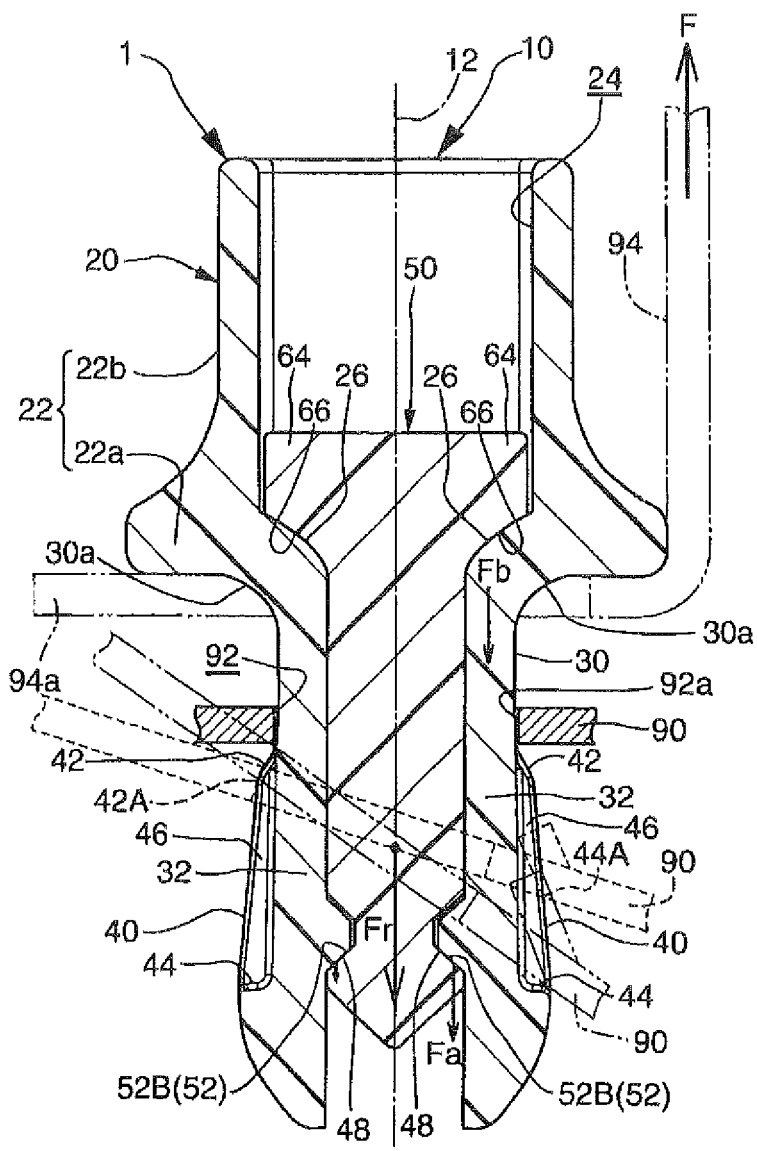
FIG. 18 is a side cross-sectional view of a fixing clip according to a second embodiment and a fixing structure for fixing a member to be installed using the fixing clip.
Figure 19:
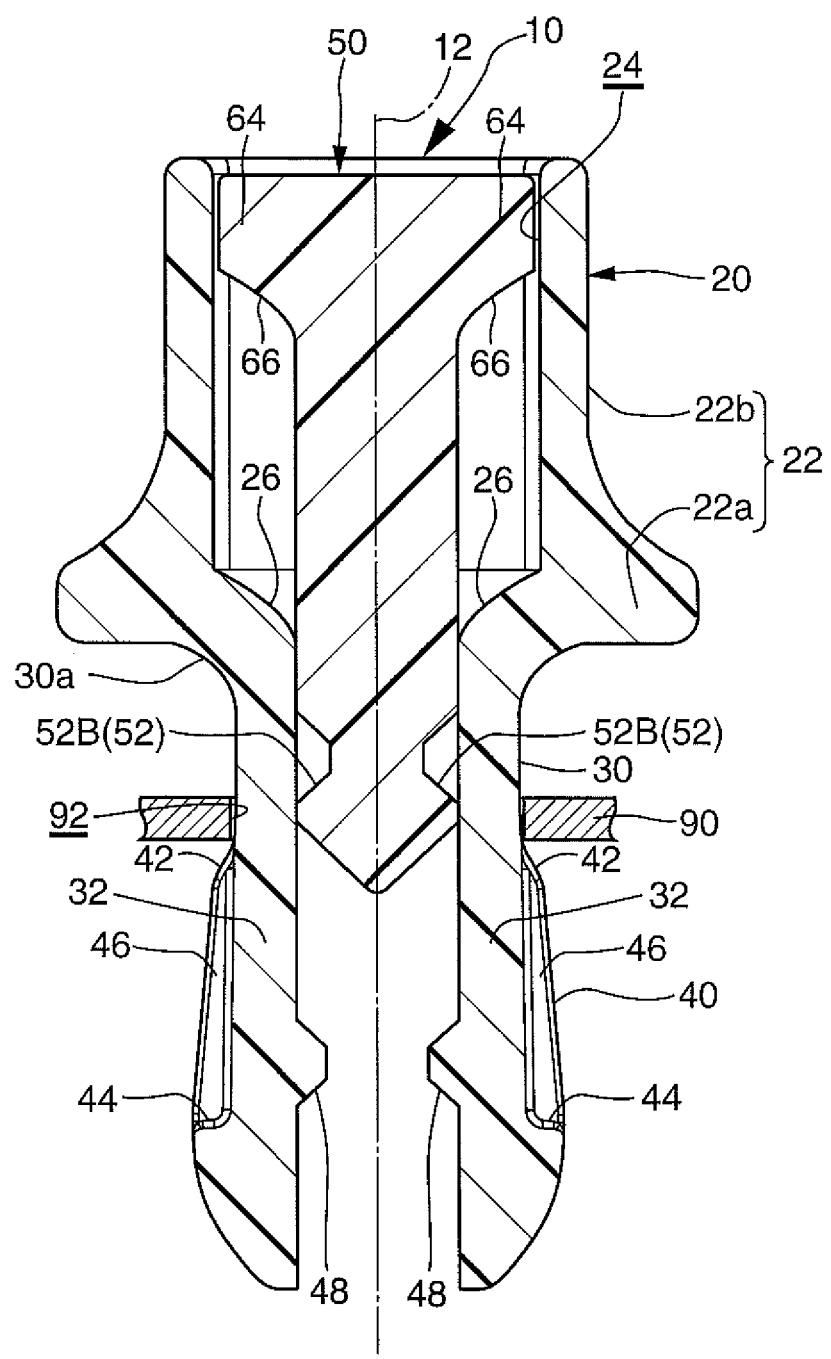
FIG. 19 is a side cross-sectional view of the fixing clip of FIG. 18 in a state that a lock pin is moved in an extracting direction to the predetermined position.
Figure 20:
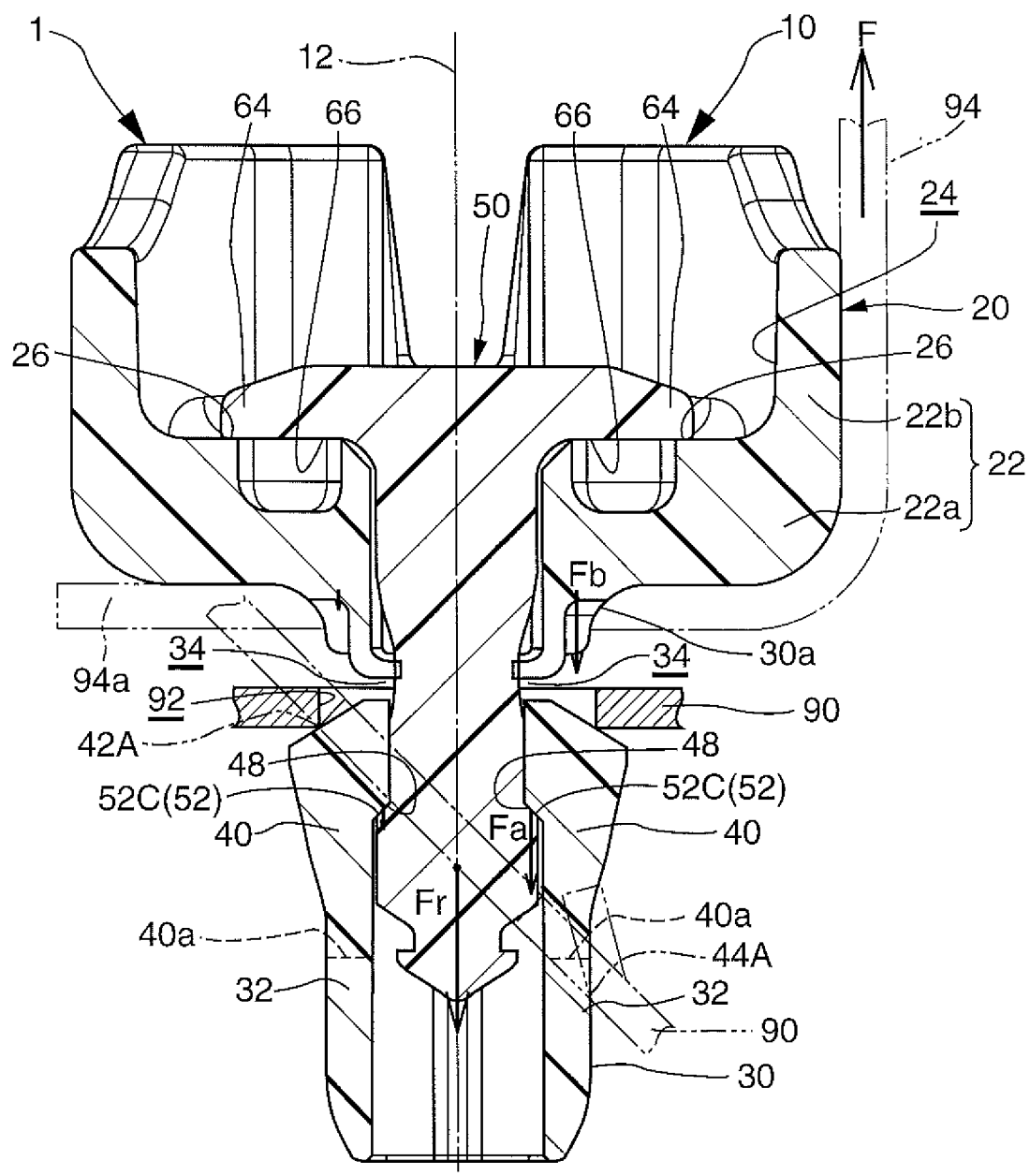
FIG. 20 is a side cross-sectional view of a fixing clip according to a third embodiment and a fixing structure for fixing a member to be installed using the fixing clip.

FIGS. 1-17 show a first embodiment. FIGS. 18 and 19 show a second embodiment, and FIG. 20 shows a third embodiment. The first, second and third embodiments may be called as merely the first, second and third embodiments hereinafter. Structural portions common over the first to third embodiments are denoted with the same reference numerals over the first to third embodiments.

Figure 2:
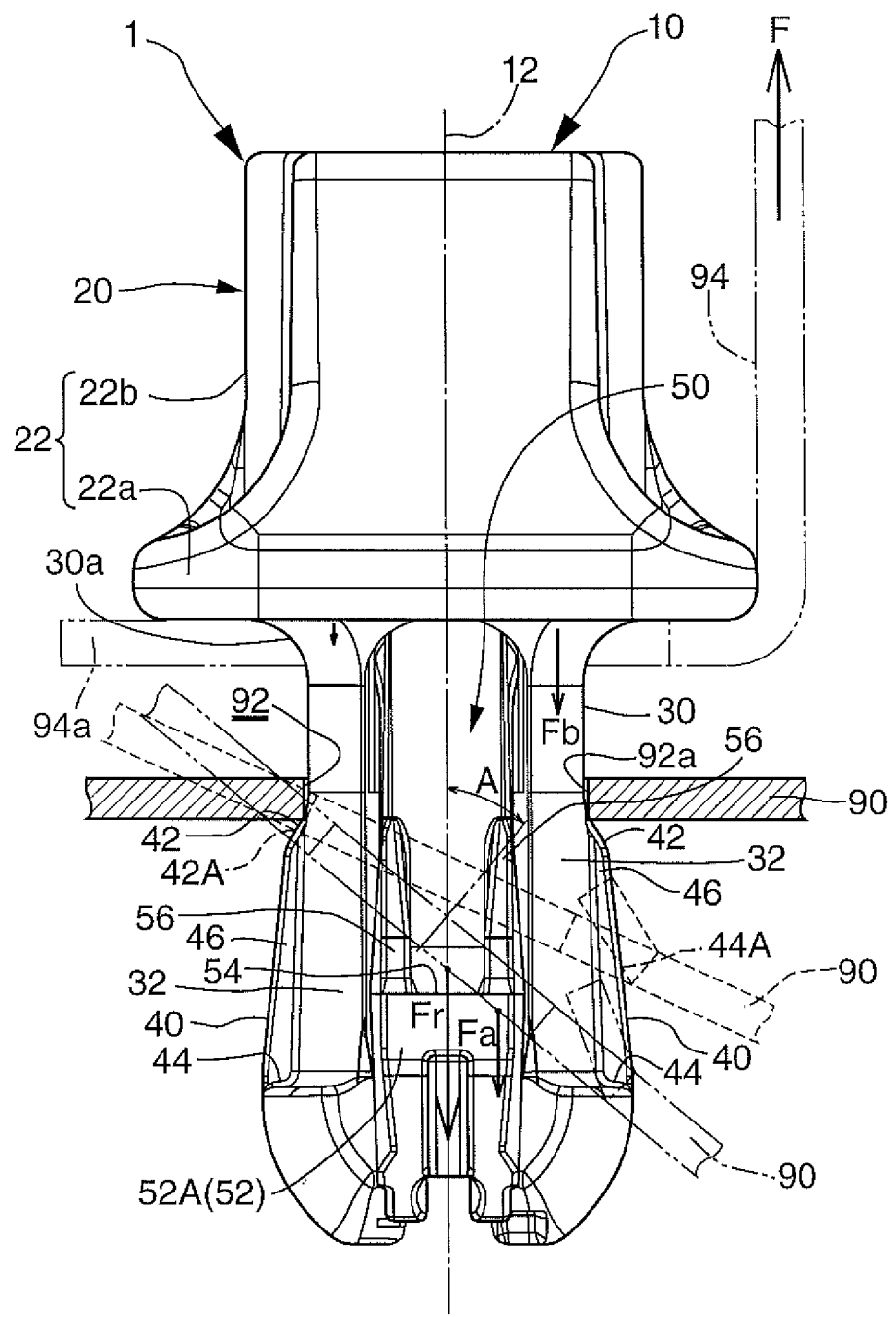
FIG. 2 is a side view of the fixing clip and the fixing structure for fixing a member to be installed of FIG. 1.
Figure 3:
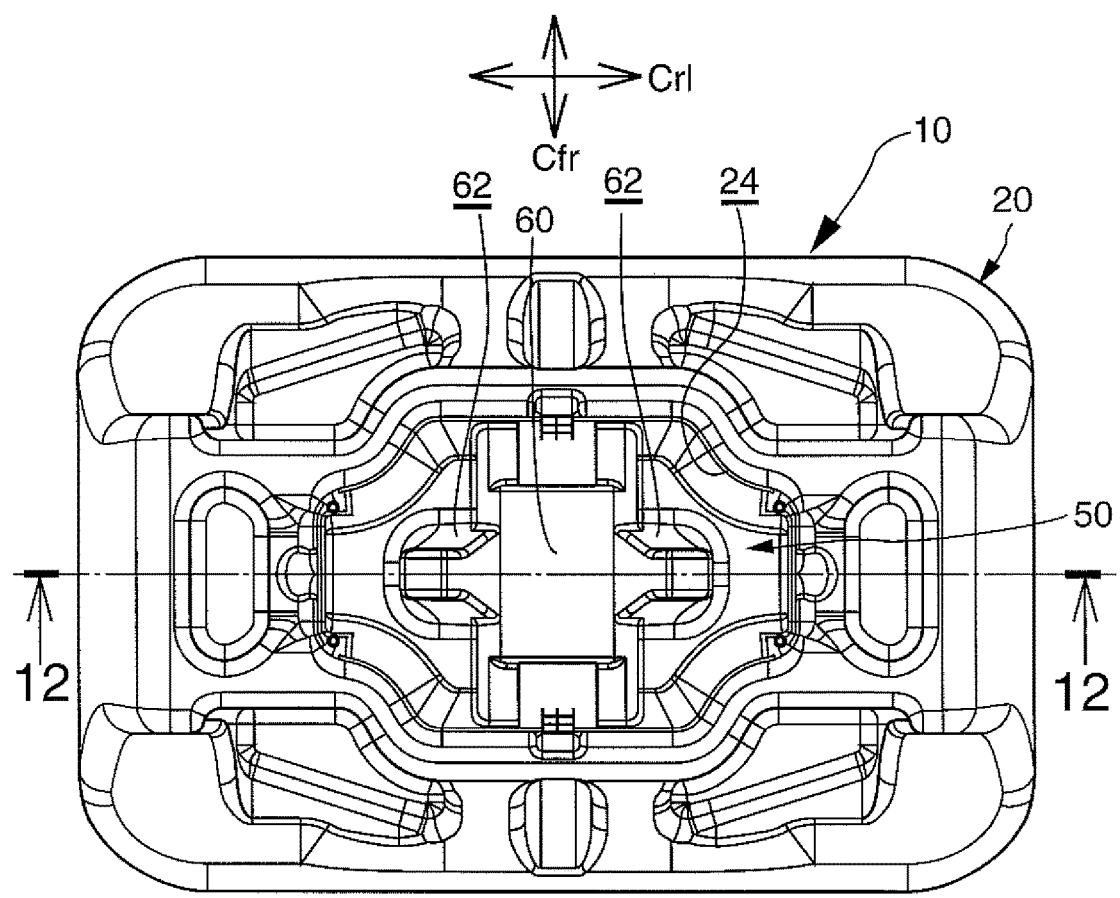
FIG. 3 is a plan view of the fixing clip of FIG. 1.

Reference "Cfr" in the drawings shows a direction connecting paired engagement hooks of the fixing clip 10 (which corresponds to a front-rear direction of the fixing clip 10 when the fixing clip 10 is viewed in the direction connecting the paired engagement hooks or in a direction extending over the paired engagement hooks, hereinafter, and may be called as merely the front-rear direction of the fixing clip). Reference "Cr1" shows a direction perpendicular to the direction connecting the paired engagement hooks of the fixing clip 10 (which corresponds to a right-left direction perpendicular to the front-rear direction of the fixing clip 10 when the fixing clip 10 is viewed in the direction connecting the paired engagement hooks or in the direction extending over the paired engagement hooks, and may be called as merely the right-left direction of the fixing clip, hereinafter). The fixing clip 10 is fixed to the body panel 90 at a clip fixing aperture 92 in a state that the front-rear direction Cfr of the fixing clip is directed in a right-left direction (a width direction) of a vehicle and the right-left direction Cr1 of the fixing clip is directed in a front-rear direction (a longitudinal direction) of the vehicle. A shape of the clip fixing aperture 92 is, for example, rectangular. Reference "F" in FIGS. 2, 18 and 20 shows a load or force with which a member 94 to be installed (e.g., a curtain airbag) pulls the fixing clip 10 when the member 94 to be installed is expanded and deployed. The body panel 90 shown in a two-dotted line or a broken line shows a position of the body panel 90 relative to the fixing clip 10 when the installed member 94 pulls the fixing clip 10 whereby the fixing clip 10 is inclined relative to the body panel 90. Though, in fact, the body panel 90 is static and the fixing clip 10 is inclined. FIGS. 2, 18 and 20 show that the fixing clip 10 is static and the body panel 90 is inclined.

First Embodiment

First, the fixing clip 10 according to the first embodiment and the fixing structure 1 for fixing an installed member using the fixing clip 10 will be explained together with effects and technical advantages thereof with reference to FIGS. 1-17.

As illustrated in FIGS. 1 and 2, the fixing clip 10 is used for fixing the member 94 to be installed to the body panel 90 of a vehicle. The member 94 to be installed is, for example, a curtain airbag which may be called a CSA (Curtain Shield Airbag). The member 94 to be installed extends in a longitudinal direction of the rectangular clip fixing aperture 92. The CSA is expanded and deployed at the time of side collision or roll-over of the vehicle, thereby protecting a head of a driver or a passenger. At the time of expanding and deploying of the member 94 to be installed, a drawing-out load F is added to the fixing clip 10 from a tab 94a of the member 94 to be installed. The body panel 90 is a panel of the vehicle which may be an inner panel of a front pillar or an inner panel of a roof side rail.

The fixing clip 10 is constructed from a synthetic resin or a complex material of the synthetic resin. A synthetic resin is, for example, polyamide 66. So long as the fixing clip material has a necessary strength, the fixing clip material is not limited to polyamide 66, and may be, for example, polyacetal, and a complexity of polyamide 66 such as polyamide 66 containing glass fibers, etc.

As illustrated in FIGS. 1, 2, 6 and 14, the fixing clip 10 includes a bushing 20 and a lock pin 50 which is a member separate from the bushing 20. The bushing 20 includes a head 22 and a leg 30 which extends in a direction away from the head 20. A cross-sectional configuration of each of the head 22 and the leg 30 perpendicular to an axial direction of the fixing clip 10 is rectangular. A rectangle of the head 22 is larger than a rectangle of the leg 30. The fixing clip 10 is fixed to the body panel 90 at the clip fixing aperture 92 in a state that a longitudinal direction of the rectangle of each of the head 22 and the leg 30 is directed in a longitudinal direction of the rectangle of the clip fixing aperture 92. The head 22 includes a seat portion (i.e., flange) 22a and a rising portion 22b rising from the seat portion 22a in a direction away from the seat portion 22a. The head 22 includes a lock pin inserting hole 24 penetrating the head 22 in the axial direction of the fixing clip. The lock pin 50 is inserted into the lock pin inserting hole 24. The bushing 20 includes paired engagement hooks 40 provided at opposed portions 32 located at opposite portions of the leg 30 and opposing each other via a center axis line 12 of the fixing clip 10 in the front-rear direction Cfr of the fixing clip 10.

The engagement hook 40 is defined as a portion of the bushing which includes a portion protruding more outward than an outside surface of the leg 30 (in a direction away from the center axis line 12 of the fixing clip) so that the engagement hook 40 can engage with an edge portion of the clip fixing aperture-defining rim of the body panel 90 located outside a long side 92a of the clip fixing aperture 92 when the fixing clip 10 is fixed to the body panel 90 and when the drawing-out load is loaded onto the fixing clip 10 from the member 94 to be installed.

In the first embodiment (FIGS. 1-17) and in the second embodiment (FIGS. 18 and 19), each of a pair of opposed portions 32 of the leg extends in the direction away from the head 22 and ends at a free end. The engaging hook 40 is formed so as to be integral with an outside surface of each opposed portion 32. An inside surface of the opposed portion 32 can contact the lock pin 50. In the third embodiment (FIG. 20), each of the paired engagement hooks 40 is connected to the leg 30 at a connecting portion 40a spaced from the head 22, extends in a direction from the connecting portion 40a toward the head 20, and ends at a free end. Each of the paired engagement hooks 40 is separated from the leg 30 by a slit 34 except for the connecting portion 40a. An inside surface of the engagement hook 40 may contact the lock pin 50.

Figure 4:
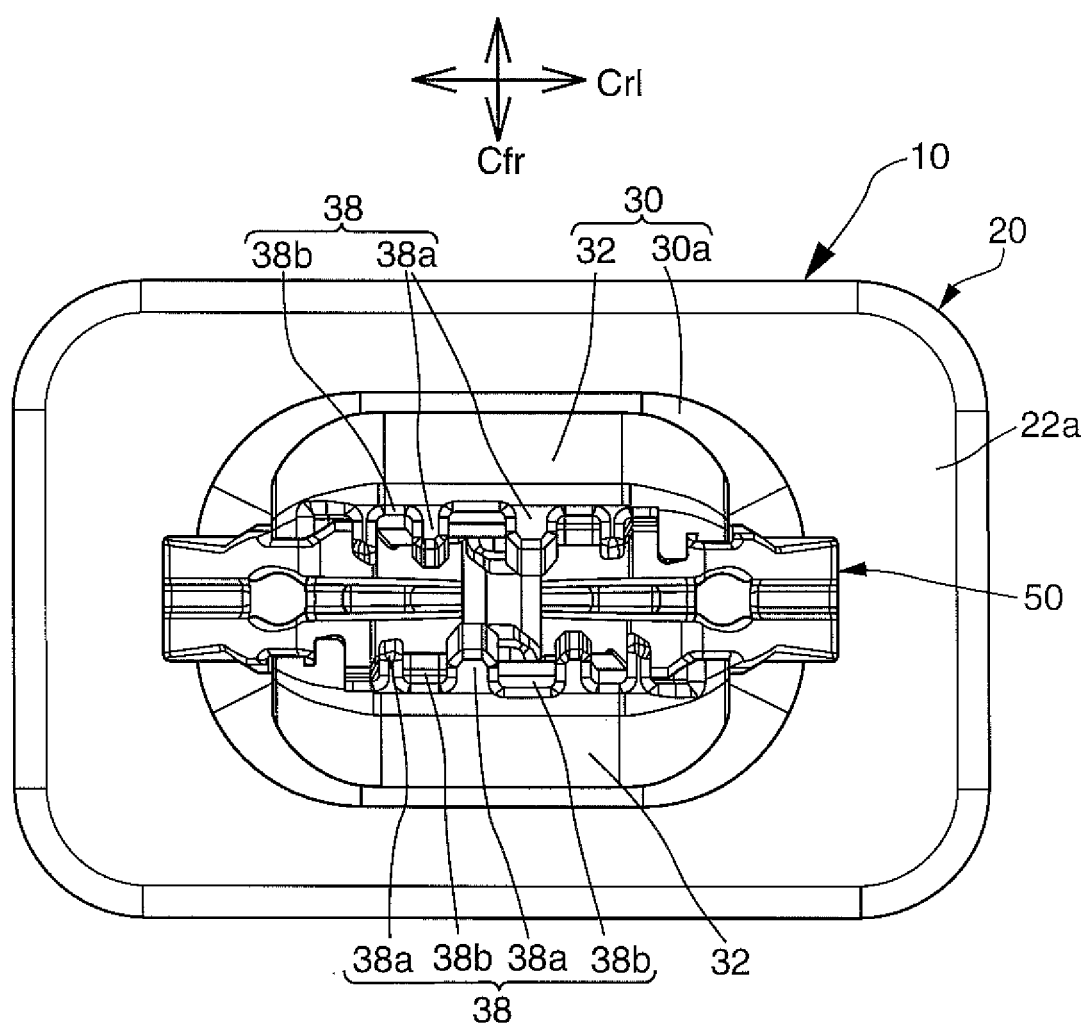
FIG. 4 is a bottom view of the fixing clip of FIG. 1.

When the fixing clip 10 is coupled to the body panel 10 at the clip fixing aperture 92, the leg 30 of the fixing clip 10 is inserted through a hole formed at the tab 94a of the member 94 to be installed and then is inserted into the clip fixing aperture 92 of the body panel. At that state, the lock pin 50 is not yet inserted into a deepest position of the lock pin inserting hole 24 so that each of the paired engagement hooks 40 can recede or be moved toward the center axis line 12 of the fixing clip 10. Therefore, when the engagement hook 40 passes through the clip fixing aperture 92, the engagement hook 40 is pushed by an inside edge of the clip fixing aperture-defining rim of the body panel 90 to elastically recede toward the center axis line 12 of the fixing clip so that the engagement hook 40 can pass through the clip fixing aperture 92. In a case where the engagement hook 40 elastically recedes together with each of the paired opposed portions 32 toward the center axis line 12 of the fixing clip, as illustrated in FIG. 4, paired convex-concave portions 38 convex and concave in an opposing direction of the paired opposed portions 32 may be formed at inside surfaces of the paired opposed portions 32 such that a convex portion 38a of one of the paired convex-concave portions 38 and a concave portion 38b of the other of the paired convex-concave portions 38 are opposed to each other. By providing such paired opposed portions 32, the paired opposed portions 32 are prevented from interfering with each other whereby receding amounts of the paired opposed portions 32 become large.

When the engagement hook 40 has passed through the clip fixing aperture 92, the engagement hook 40 elastically returns to an original position. At this state, the lock pin 50 is inserted into the deepest position of the lock pin inserting hole 24. A tip portion of the lock pin 60 comes to a position between the paired engagement hooks 40 so that the paired engagement hooks 40 cannot move toward the center axis line 12 of the fixing clip. As a result, the fixing clip 10 cannot be drawn out from the body panel 90.

When the member 94 to be installed has been fixed to the body panel 90, the tab 94a of the member 94 to be installed and the clip fixing aperture 92-defining rim of the body panel 90 are positioned between a head-side end of the engagement hook 40 and the head 22. The tab 94a is pushed to the body panel 90 by an elastic spacer which is positioned between the head 22 and the body panel 90. The elastic spacer may be formed separate from the bushing 20 or may be formed integral with the bushing 20.

When the drawing-out load F is loaded onto the fixing clip 10 from the member 94 to be installed at such a time as expansion and development of the member 94 to be installed, etc., the drawing-out load F is added to one end (one end in the front-rear direction Cfr of the fixing clip) of the seat portion 22a. The drawing-out load F acts in a direction substantially perpendicular to the body panel 90 and in a direction away from the body panel 90. Since the drawing-out load F is offset from the center axis line 12 of the fixing clip, a moment is generated at a root of the leg 30.

The lock pin 50 includes a load receiving portion 52 where, when the drawing-out load F is loaded on the fixing clip 10 from the member 94 to be installed, i.e., when a reaction force Fr of the drawing-out load F is added to the fixing clip 10 from the body panel 90, the lock pin 50 receives one part Fa (Fa<F) of the drawing-out load F, more exactly, one part Fa of the reaction force Fr of the drawing-out load F. A magnitude of the reaction force Fr is the same as a magnitude of the drawing-out load F and a direction of the reaction force Fr is opposite a direction of the drawing-out load F. That one part Fa of the reaction force Fr of the drawing-out load F is directed in the same direction as the reaction force Fr of the drawing-out load F and is positioned on a vector of the reaction force Fr of the drawing-out load F. The load receiving portion 52 is defined by a side hook 52A formed at the lock pin 50 in the first embodiment, a load receiving surface 52B formed at the lock pin 50 in the second embodiment, and a load receiving surface 52C formed at the lock pin 50 in the third embodiment, respectively.

On the other hand, the bushing 20 includes a pressure receiving surface 26 where the bushing 20 receives that one part Fa which the lock pin 50 has received, of the drawing-out load F, more exactly, the reaction force Fr of the drawing-out load F. The pressure receiving surface 26 may extend in a direction reverse to an insertion of the lock pin into the bushing and away from the center axis line 12 of the fixing clip thereby spreading in the direction reverse to the insertion direction of the lock pin. The pressure receiving surface 26 may be a curved surface as shown in FIG. 5, or may be a flat surface perpendicular to the center axis line 12 of the fixing clip as shown in FIG. 6.

The pressure receiving surface 26 of the bushing 20, except an end portion of the pressure receiving surface 26 located on a side close to the center axis line 12 of the fixing clip and extending into the leg 30, may be located at an inside surface of the head 22 of the bushing 20. The end portion of the pressure receiving surface 26 located on the side close to the center axis line 12 of the fixing clip may be located on a side closer to the tip of the leg than a space formed inside the head 22 of the bushing, and more particularly, may be located on the side closer to the tip of the leg than a lower surface (i.e., a leg tip-side surface) of the seat portion 22*a* in the axial direction of the fixing clip.

Figure 5:
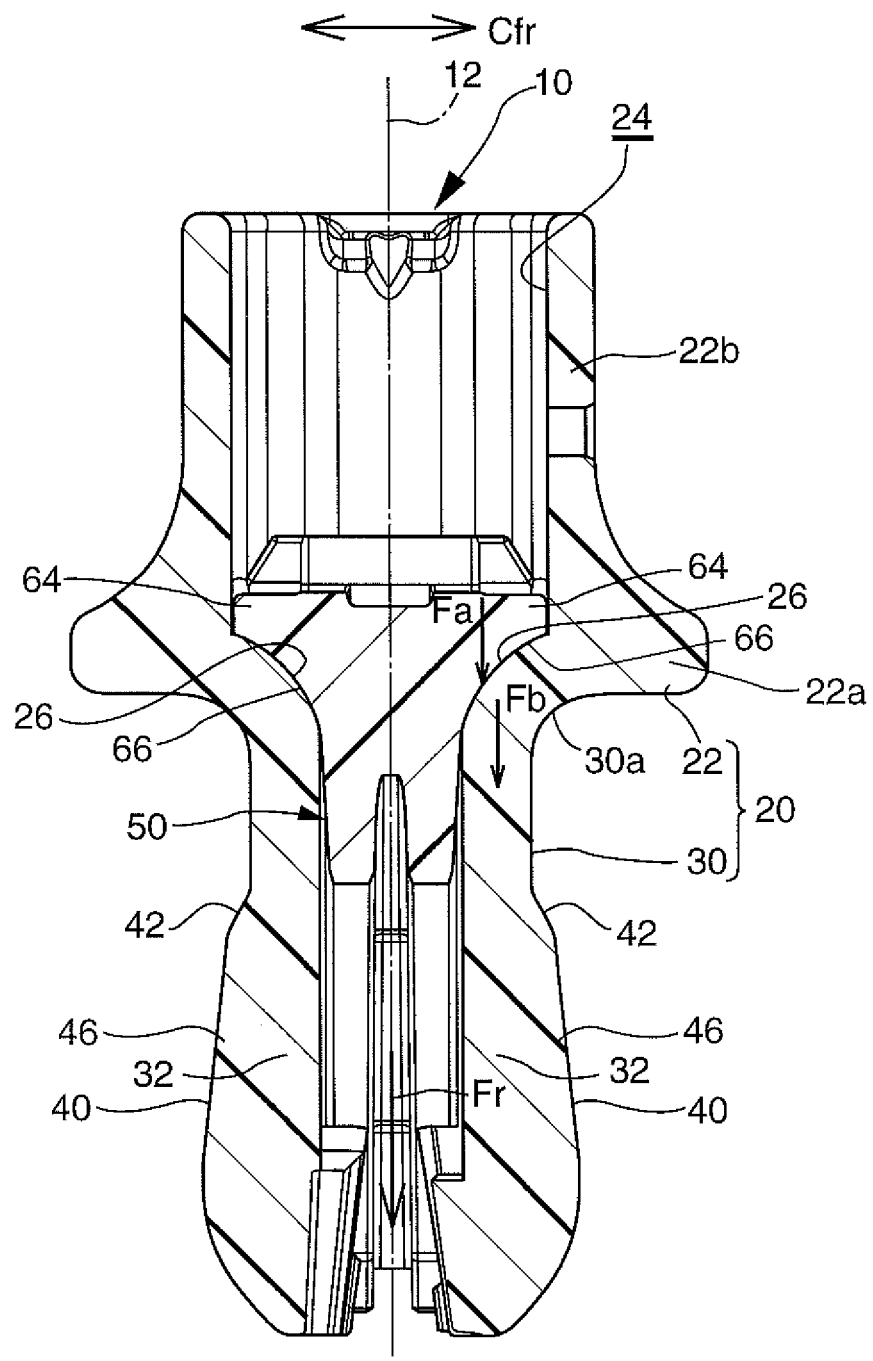
FIG. 5 is a cross-sectional view of the fixing clip of FIG. 1 taken along line 5-5 of FIG. 1.
Figure 6:
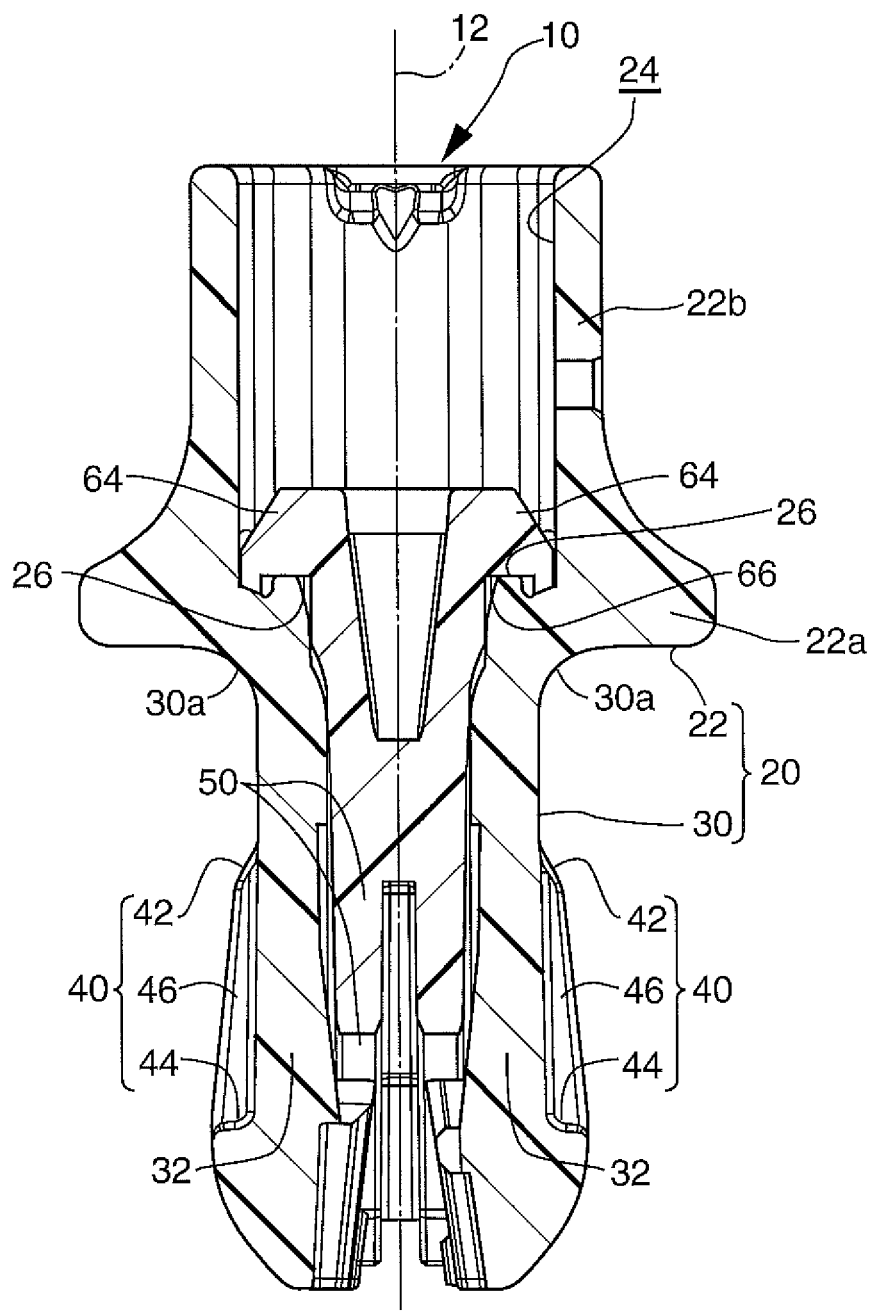
FIG. 6 is a cross-sectional view of the fixing clip of FIG. 1 taken along line 6-6 of FIG. 1.

As illustrated in FIGS. 5 and 6, the lock pin 50 may include a bulged portion 64 and a pushing surface 66. The bulged portion 64 is bulged in the direction away from the center axis line 12 of the fixing clip so as to oppose the pressure receiving surface 26 of the bushing 20 in the axial direction of the fixing clip in a state that the lock pin 50 has been inserted into the deepest position of the bushing. The pushing surface 66 is formed at the bulged portion 64 and is capable of contacting the pressure receiving surface 26 to thereby push the pressure receiving surface 26 in the axial direction of the fixing clip. The part of the drawing-out load which the lock pin 50 has received (i.e., that one part Fa of the reaction force Fr of the drawing-out load F) is transmitted to the bushing 20 through transmission from the pushing surface 66 to the pressure receiving surface 26.

In a case where all portions or almost all portions of the pressure receiving surface 26 are formed inside the head 22 of the bushing 20, the head 22 of the bushing 20 receives that one part Fa of the reaction force Fr of the drawing-out load F transmitted through the lock pin 50 and a remainder Fb (Fb=F−Fa) of the reaction force Fr of the drawing-out load F transmitted through the root of the leg 30 (i.e., a connecting portion of the leg 30 to the head 22). Fb is a vector which has the same direction as Fr and is positioned on Fr. That one part Fa of the reaction force Fr of the drawing-out load which the lock pin 50 has received is transmitted through the lock pin 50 itself to the head 22 of the bushing 20 without passing through the leg 30 of the bushing 20.

Due to providing the load receiving portion 52 at the lock pin 50, the following effects and technical advantages are obtained:

In the conventional fixing clip, a lock pin does not receive any drawing-out load loaded to the fixing clip from the member to be installed. In contrast, in the embodiments, by providing the load receiving portion 52 at the lock pin 50, the lock pin 50 can receive one part Fa of the reaction force Fr of the drawing-out load F. Thus, when the drawing-out load F is loaded on the fixing clip 10 from the member 94 to be installed, the drawing-out load F can be received by both of the bushing 20 and the lock pin 50. As a result, in the embodiments, the load F which the log 30 of the bushing 20 has to bear is decreased to Fb compared with the conventional case by the amount of Fa which the lock pin 50 shares. On the contrary, in a case where the leg 30 bears a load F as in the conventional case, a drawing-out load which the fixing clip 10 of the embodiments can bear can be increased to (F+Fa) by the amount of Fa which the lock pin 50 bears.

Further, since all or almost all of the pressure receiving surface 26 is formed inside the head 22 of the bushing 20, the load Fe which the lock pin 50 has received is transmitted to the bulged portion 64 inside the head 22 through the lock pin 50 itself without or almost without passing through the leg 30 of the bushing 20, and then is transmitted from the bulged portion 64 to the pressure receiving surface 26 of the bushing 20. As a result, a charge of the leg 30 of the bushing 20 can be decreased from the F of the conventional case to Fb of the embodiments, so that the bushing 20 is unlikely to be broken at the root of the leg 30.

The above structures, effects and technical advantages of the first embodiment can be applied to the second and third embodiments also.

The fixing clip 10 of the first embodiment further includes structures, effects and technical advantages described below.

As illustrated in FIGS. 1 and 2, the lock pin 50 includes side hooks 52A which protrude more than side surfaces of the leg 30 of the bushing 20 in a right-left direction Cr1 perpendicular to the front-rear direction Cfr connecting the paired engagement hooks 40 when the lock pin 50 is inserted into the deepest position inside the bushing 20. The side hook 52A defines the load receiving portion 52 in the first embodiment.

Since the side hook 52A is provided to the lock pin 50, the one part Fa of the drawing-out load reaction force Fr loaded on the fixing clip 10 from the body panel 90 can be directly received by the lock pin 50. The load Fa which the lock pin 50 has received can be transmitted to the head 22 of the bushing 20 through the lock pin 50 itself without passing via the leg 30 of the bushing 20 and the engagement hook 40 and can be received by the pressure receiving surface 26 of the head 22. As a result, a charge loaded on the leg 30 and the engagement hook 40 in load transmission can be surely decreased. Further, since the load is transmitted not through the leg 30 and the engagement hook 40 of the bushing 20, a load transmittance route from the load receiving portion 52 to the pressure receiving surface 26 can be simplified. In the first embodiment, the load loaded on the engagement hook 40 can be more decreased and the load transmittance route can be more simplified than in the second and third embodiments where the load transmittance route thereof includes the engagement hook 40.

A guide surface 28 is formed at an inside surface of each of the opposed portions 32 (opposing each other in the front-rear direction of the fixing clip 10) of the leg 30 of the bushing 20. The guide surface 28 protrudes inwardly from the inside surface of each of the opposed portions 32. The guide surface 28 is brought into contact with the lock pin 50 when the lock pin 50 is on a way from a temporary holding position (a position shown in FIG. 13) to a final inserting position (i.e., the deepest inserting position, shown in FIG. 12) of the bushing 20, so that a span between the side hooks 52A is enlarged. When the lock pin 50 is located at the final inserting position, each side hook 52A protrudes more outward than the side surface of the fixing clip in the right-left direction Cr1 of the fixing clip 10.

More particularly, the guide surface 28 is provided at a position located on a way from the temporary holding position (FIG. 13) to the final inserting position (FIG. 12), where the guide surface 28 begins to contact with the lock pin 50. The guide surface 28 is constructed of an inclined surface inclined in the lock pin inserting direction and in the direction away from the center axis line 12 of the fixing clip, whereby the guide surface 28 spreads the side hooks 52A when the lock pin 50 is inserted into the bushing 20. The lock pin 50 includes a pair of arms 58 coupled with each other so as to be rotatable about an arm connecting portion 60. The side hook 521 is formed at an outside surface of each arm 58 so as to be integral with the arm 58. The guide surface 28 formed at the bushing 20 is brought into sliding-contact with inside surfaces of the pair of arms 58 and rotates the arms 58 about the arm connecting portion 60 to thereby spread the side hooks 52A together with the arms 58 in the right-left direction Cr1 of the fixing clip, when the lock pin 50 is inserted to the deepest position in the bushing 20.

When the lock pin 50 is located at the temporary holding position (shown in FIG. 13), a space between the pair of side hooks 52A is held small. When the arm connecting portion 60 is held at the state for a long period of time, the space between the pair of side hooks 52A may be unlikely to be enlarged. As a result, the space between the pair of side hooks 52A may not always be enlarged due to an elasticity of the arm connecting portion 60 when the lock pin 50 is pushed into the bushing 20. However, since the guide surface 28 is formed at the bushing 20 in the first embodiment, when the lock pin 50 is pushed into the deepest position in the bushing, the side hooks 52A are forcibly and surely spread to the positions where the side hooks 52A can engage the body panel 90.

As illustrated in FIG. 2, when the drawing-out load F acts to the fixing clip 10 from the member 94 to be installed, a tension force F and a moment act on the fixing clip 10 so that the fixing clip 10 is inclined relative to the body panel 90 and engage the body panel 90. Though not the fixing clip 10 but the body panel 90 is shown in an inclined state in FIG. 2, actually not the body panel 90 but the fixing clip 10 is inclined.

In the state that the fixing clip 10 is inclined relative to the body panel 90, as illustrated in FIG. 2, the fixing clip 10 engages the body panel 90 at a first engagement portion 42A of one of the paired engagement hooks 40 and at a second engagement portion 44A of the other of the paired engagement hooks 40. Axial distances from the head 22, of the first and second engagement portions 42A and 44A are different from each other. The axial distances from the head 22, of the first and second engagement portions 42A and 44A change according to an inclination of the fixing clip 10 relative to the body panel 90.

Due to inclining of the fixing clip 10 relative to the body panel 90, a bending moment and a tension force acting on a root 30a of the leg 30 (a connecting portion of the leg to the head) are decreased to a great extent compared with a case where the fixing clip 10 is not inclined relative to the body panel 30, so that the endurability of the fixing clip 10 against a drawing-out load can be improved. In more detail, since the tension force F acts in a direction perpendicular to the body panel 90 irrespective of inclination of the fixing clip 10, when the fixing clip 10 is inclined relative to the body panel 90 by an angle "A", (where the angle "A" is an angle between a center axis line 12 of the fixing clip 10 and a center line of the clip fixing aperture 92 perpendicular to the body panel 90) a distance from the center axis line of the leg 30 to a line of action of the tension force F is decreased to [(that distance)×cos A], and a tension force acting on the leg 30 in an axial direction of the leg 30 is also decreased to [(that tension force)×cos A]. As a result, a bending moment and a tension force loaded on the root (the connecting portion to the head) 30a of the leg 30 are decreased to a great extent, compared with a case where the fixing clip 10 engages the body panel 90 keeping a state that the fixing clip 10 is perpendicular to the body panel. 90. As a result, the bushing 20 is prevented from being broken at the root 30a of the leg 30 so that the endurability of the fixing clip 10 is improved to a great extent.

The above features that the fixing clip 10 engages the body panel 90 keeping the state that the fixing clip 10 is inclined relative to the body panel 90 whereby the endurability of the fixing clip 10 is improved is also applicable to a second embodiment described later.

Each engagement hook 40 is spaced from the head 22 in a direction toward the tip of the leg. Each engagement hook 40 includes two steps of engagement portions including a head-side engagement portion 42 located at a head-side end of the engagement hook 40 and a leg tip-side engagement portion 44 spaced from the head-side engagement portion 42 in the direction toward the tip of the leg. The head-side engagement portion 42 is constructed of an inclined surface inclined so as to extend from an outside surface of the leg 30 in a direction toward the tip of the leg and away from the center axis line 12 of the fixing clip. The leg tip-side engagement portion 44 extends from the outside surface of the leg 30 in a direction perpendicular to the center axis line 12 of the fixing clip and away from the center axis line 12 of the fixing clip. The head-side engagement portion 42 may be discontinuous in the right-left direction Cr1 of the fixing clip.

A strength and a rigidity in the axial direction of the fixing clip of the head-side engagement portion 42 are designed to be smaller than those of the leg tip-side engagement portion 44, respectively. The strength and the rigidity of the head-side engagement portion 42 are set at such a level that when the drawing-out load F from the member 94 to be installed is loaded on the fixing clip 10 and the fixing clip 10 is inclined, the head-side engagement portion 42 is appropriately shaved by the edge of the fixing clip aperture 92-defining rim of the body panel. 90 whereby an excessively large shock load is prevented from being loaded on the engagement hook 40 and the leg 30. The leg tip-side engagement portion 44 is given a sufficient strength and a sufficient rigidity which are determined from a thickness along the axial direction of the fixing clip, of the leg tip-side engagement portion 44 so that when the edge of the fixing clip aperture 92-defining rim of the body panel 90 engages the leg tip-side engagement portion 44, the engagement hook 40 is prevented from being further shaved, that is, the leg tip-side engagement portion 44 acts as a final stopper for being shaved.

A relationship between the head-side and the leg tip-side engagement portions 42 and 44 and the first and the second engagement portions 42A and 44A afore-mentioned is as follows:

As illustrated in FIG. 2, when the fixing clip 10 is inclined relative to the body panel 90 (as shown by a broken line in FIG. 2) at a certain inclination angle and engages the body panel 90 at the first engagement portion 42A and the second engagement portion 44A, the first engagement portion 42A is located at the head-side engagement portion 42 or closer to the tip of the leg than the head-side engagement portion 42. The second engagement portion 44A is located at the leg tip-side engagement portion 44 or closer to the head than the leg tip-side engagement portion 44.

By constructing the engagement hook 40 from the two steps of engagement portions 42 and 44, the following technical advantages are obtained:

At small inclination angles, the head-side engagement portion 42 and an outer portion (in a thickness direction) of the opposed portion 32 of the leg 30 located inside the head-side engagement portion 42 are shaved, thereby decreasing the bending moment and the tension force loaded on the leg 30. At large inclination angles, when the body panel 90 is brought into engagement with the leg tip-side engagement portion 44, the leg tip-side engagement portion 44 and an outer portion (in a thickness direction) of the opposed portion 32 of the leg 30 located inside the leg tip-side engagement portion 44 are prevented from being further shaved, whereby an accident that all portions of the leg tip-side engagement portion 44 are shaved is prevented from happening so that the fixing clip 10 is prevented from being taken off from the body panel 90. As a result, two incompatible features that the engagement hook 40 is likely to be shaved and that the engagement hook 40 is unlikely to be shaved can be satisfied by the two steps of engagement portions 42 and 44.

Figure 9:
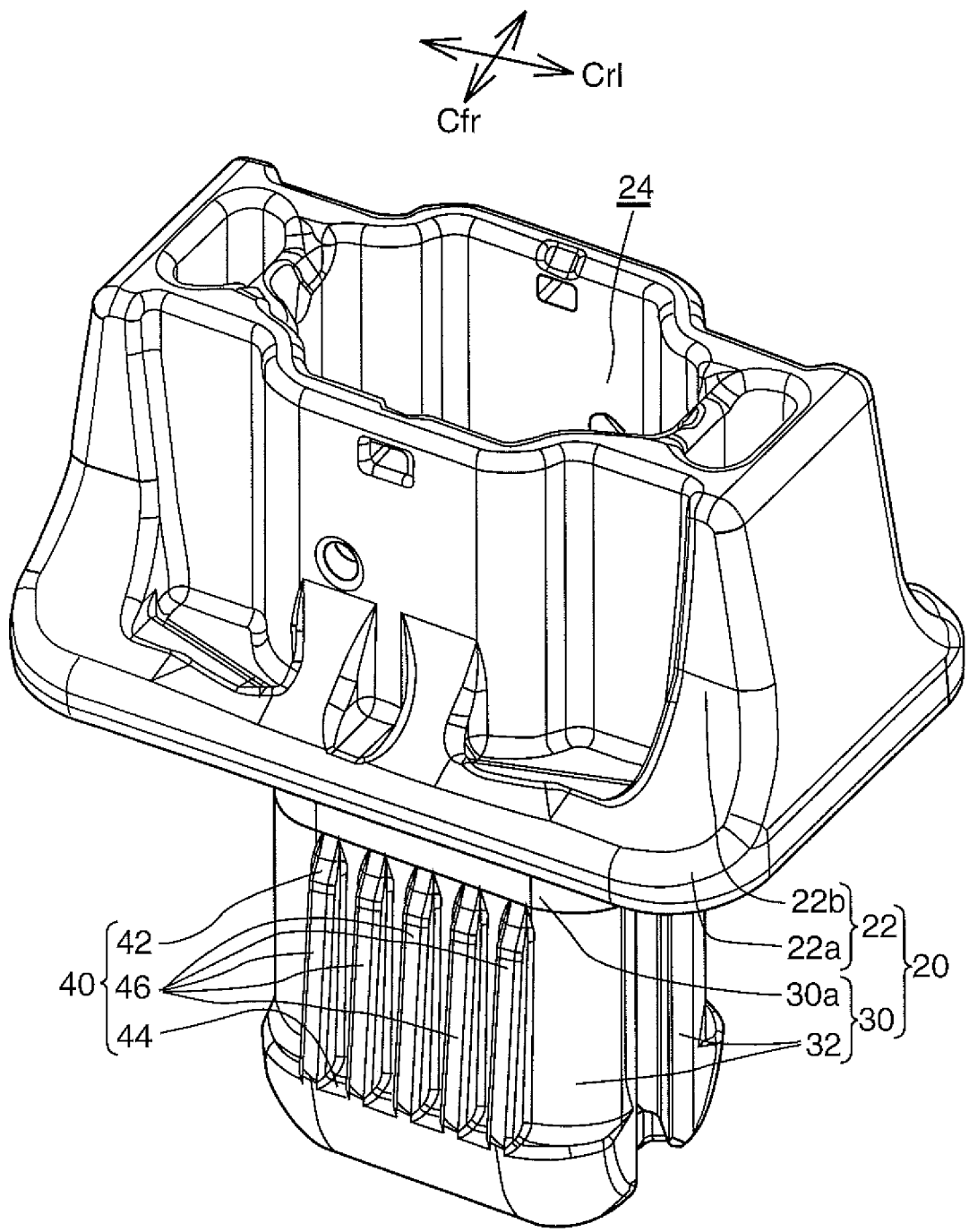
FIG. 9 is a perspective view of a bushing alone of the fixing clip of FIG. 1.
Figure 14:
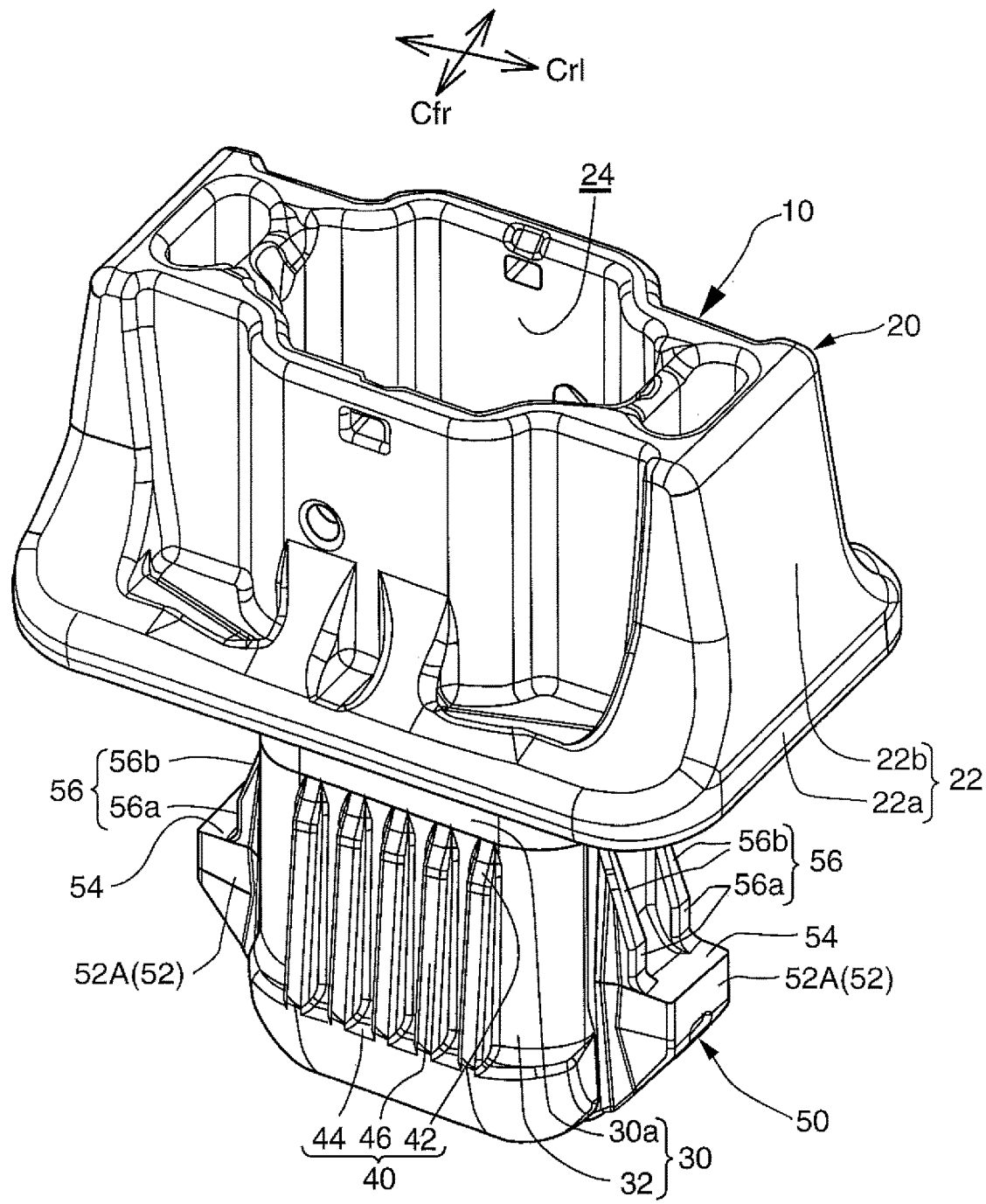
FIG. 14 is a perspective view of the fixing clip of FIG. 1 in a state that the fixing clip is fixed to a body panel.
Figure 15:
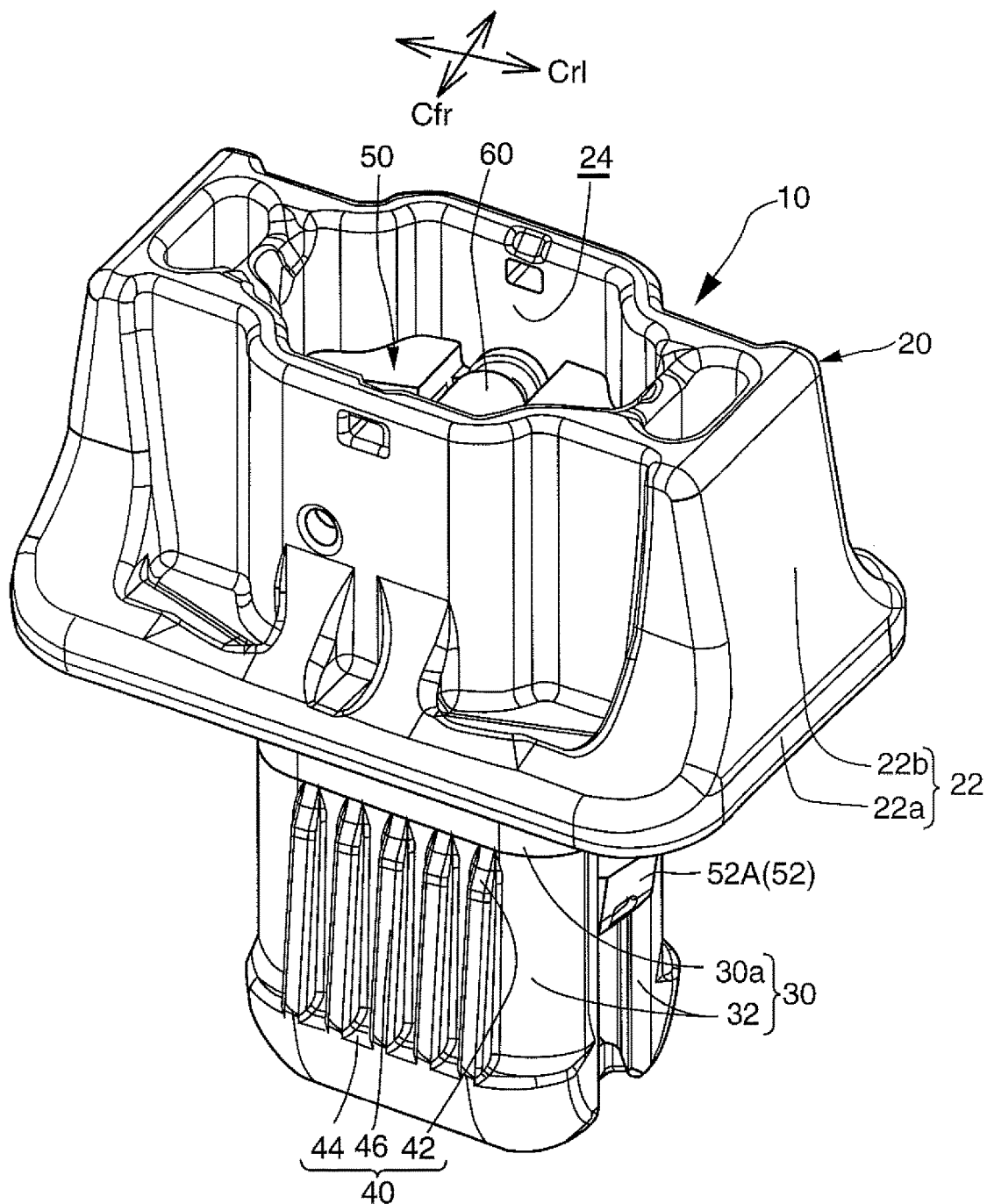
FIG. 15 is a perspective view of the fixing clip of FIG. 1 in a state that the fixing clip is removed from the body panel or is not yet fixed to the body panel.
Figure 16:
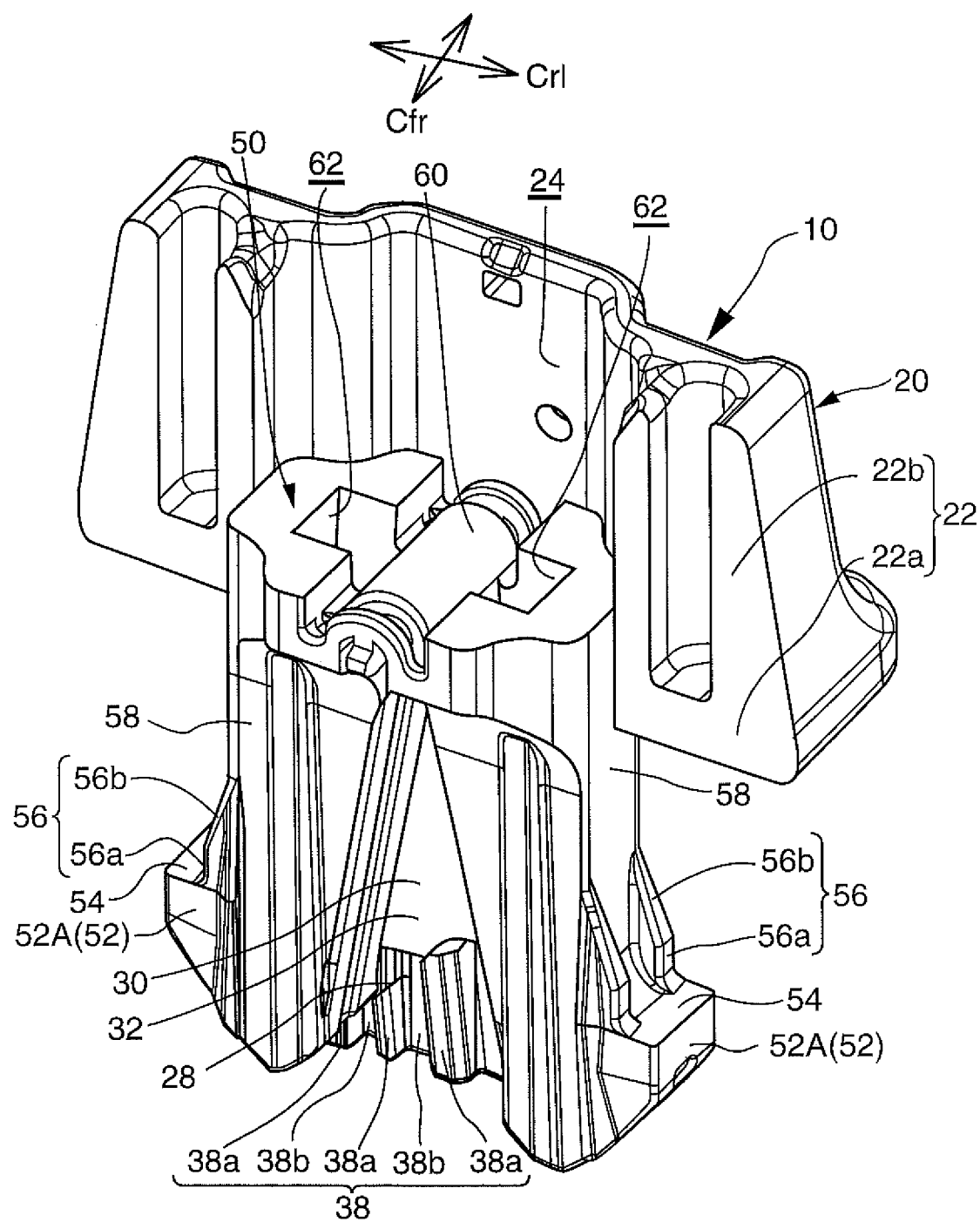
FIG. 16 is a perspective view of the fixing clip of FIG. 1 in a state that the lock pin is inserted to a deepest position in the bushing which is shown in a half-cut state.
Figure 17:
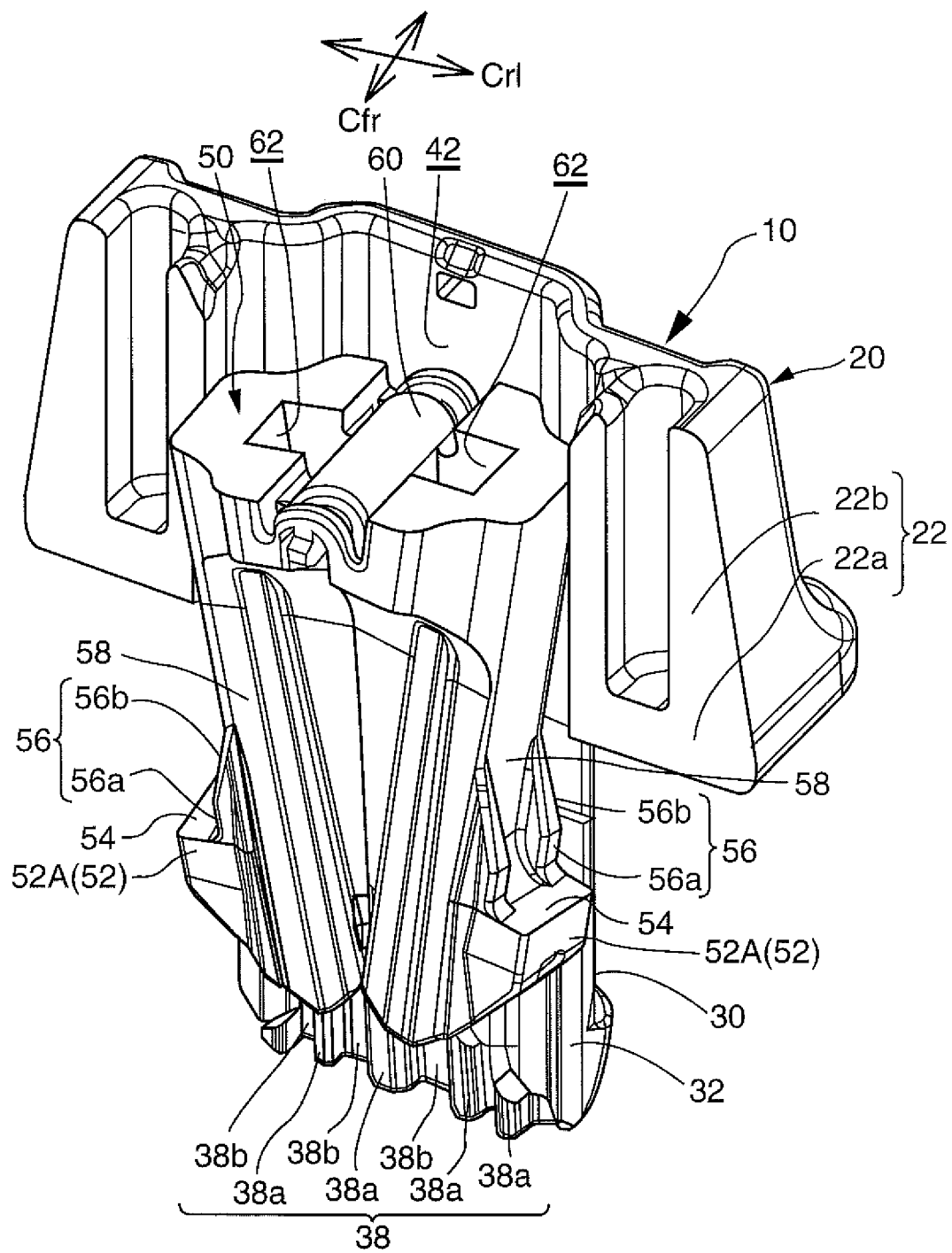
FIG. 17 is a perspective view of the fixing clip of FIG. 1 in a state that the lock pin is inserted to or is extracted to a temporary holding position in the bushing which is shown in a half-cut state.

Each engagement hook 40 may include a plurality of ribs 46 extending continuously or discontinuously in the axial direction of the fixing clip 10 from the leg tip-side engagement portion 44 toward the head. In a case where the rib 46 is discontinuous, the rib 46 is formed in the pattern of a dotted line. In a case where the engagement hook 40 includes the rib 46, a head-side end of the rib 46 forms the head-side engagement portion 42 of the engagement hook 40. FIGS. 1, 9 and 14 illustrate a case where the engagement hook 40 is constructed from continuous ribs 46 arranged in parallel with each other in the right-left direction Cr1 of the fixing clip and where an outside surface of the leg 30 is located between adjacent ribs 46. The head-side engagement portion 42 is cut between the adjacent ribs 46 in the right-left direction Cr1 of the fixing clip 10 and is discontinuous in the right-left direction Cr1 of the fixing clip 10. The leg tip-side engagement portion 44 is continuous between the adjacent ribs 46 in the right-left direction Cr1 of the fixing clip 10 and is continuous in the right-left direction Cr1 of the fixing clip 10. At the rib 46, the leg tip-side engagement portion 44 is integral with the rib 46.

In a case where the engagement hook 40 includes the rib 46, by selecting a width of the rib 46 appropriately, it is possible to adjust an easiness that the rib 46 including the head-side engagement portion 42 and the outside portion of the opposed portion 32 of the leg located inside the rib 46 are shaved by the edge of the fixing clip aperture 92-defining rim of the body panel 90 when the fixing clip 10 is being inclined relative to the body panel 90. Since the rib 46 and the outside portion of the opposed portion 32 of the leg located inside the rib 46 absorb energy when shaved, a collision speed at which the fixing clip aperture 92-defining rim of the body panel 90 collides with the leg tip-side engagement portion 44 is mitigated. As a result, the leg tip-side engagement portion 44 and the outside portion of the opposed portion 32 of the leg located inside the leg tip-side engagement portion 44 can be suppressed or prevented from being shaved by the fixing clip aperture 92-defining rim of the body panel 90.

The above structures, effects and technical advantages as to providing the two steps of engagement portions 42 and 44 to the engagement hook 40 and providing a plurality of ribs 46 discontinuously in the right-left direction Cr1 of the fixing clip are also applicable to the second embodiment which will be described later.

In a case where the load receiving portion 52 of the lock pin 50 is constructed from the side hook 52A, the fixing clip 10 further takes the following structures:

As illustrated in FIGS. 1 and 2, in a state that the lock pin 50 has been inserted in the lock pin inserting hole 24 to the deepest position, the side hook 52A of the lock pin 50 is located in the direction (i.e., the right-left direction Cr1 of the fixing clip) perpendicular to the direction (i.e., the front-rear direction Cfr of the fixing clip) connecting the paired engagement hooks 40.

The engagement surface 54 (which will be described later) of the side hook 52A of the lock pin 50 is located closer to the tip of the leg 30 in the axial direction of the fixing clip 10 than the head-side end of each engagement hook 40. As a result, in a normal operating state where the drawing-out load from the member 94 to be installed is not loaded on the fixing clip 10 and both of the head-side engagement portions 42 of the paired engagement hooks 40 engage the body panel 90, the side hooks 52A of the lock pin 50 are located at a position spaced from the body panel 90 toward the tip of the leg and do not engage the body panel 90.

Effects and technical advantages according to the above structures are as follows:

In the case where the side hook 52A is located in the direction perpendicular to the front-rear direction Cfr of the fixing clip (i.e., the direction connecting the paired engagement hooks 40), when the drawing-out load F from the member 94 to be installed acts to the fixing clip 10, the fixing clip 10 begins to be inclined relative to the body panel 90. At this time, a portion of the body panel where the side hook 52A engages the body panel, i.e., a short-side edge of the rectangular fixing clip aperture 92-defining rim of the body panel 90 is bent by the side hook 52A in the direction in which the fixing clip is drawn out, and resists the bending deformation of the aperture 92-defining rim of the body panel. As a result, the side hook 52A also can surely share a part Fa of the drawing-out load F. Further, an inclination of the fixing clip 10 relative to the body panel 9 is more decreased than a case where inclination of the fixing clip 10 relative to the body panel is regulated only by a long-side edge of the rectangular fixing clip aperture 92-defining rim of the body panel 90.

Further, in the case where the side hook 52A of the lock pin is located closer to the tip of the leg 30 in the axial direction of the fixing clip 10 than the head-side end of each engagement hook 40, when the drawing-out load F from the member 94 to be installed acts to the fixing clip 10, the fixing clip 10 is inclined relative to the body panel 90. At this time, a moderate load is loaded on the side hooks 52A, so that the drawing-out load F loaded on the fixing clip 10 from the member 94 to be installed can be shared in a good balance and can be received by the side hooks 52A and the engagement hooks 40. If the side hooks 52A were located at the same axial position as the head-side ends of the paired engagement hooks 40, a load shared by the side hooks 52A would be too large.

In a state where the fixing clip 10 is inclined relative to the body panel 90 at a certain angle, a positional relationship between the first and the second engagement portions 42A and 44A and the engagement surfaces 54 of the side hooks 52 will be explained. More particularly, as illustrated in FIG. 2, when the fixing clip 10 engages the body panel 90 at the first engagement portion 42A and the second engagement portion 44A distances of which from the head 22 are different from each other, the first engagement portion 42A is located closer to the head 22 than the side hook 52A, and the second engagement portion 44A is located closer to the tip of the leg than the side hook 52A.

Of the drawing-out load F loaded on the fixing clip 10 from the body panel 90, a load Fb except the load Fa which the side hook 52A shares is received by the first engagement portion 42A and the second engagement portion 44A, and the load Fa is received by the side hook 52A. Since the first engagement portion 42A, the side hook 52A and the second engagement portion 44A are deformable, respectively, a reaction force of the drawing-out load loaded on the fixing clip 10 is shared and is received by the first engagement portion 42A, the side hook 52A and the second engagement portion 44A in a good balance.

Further, since an energy is absorbed when the engagement hook 40 on the side of the second engagement portion 44A (i.e., on a side closer to the line of action of the drawing-out load F than the center axis line 12 of the fixing clip) is shaved by the edge of the fixing clip aperture 92-defining rim of the body panel 90, a breakage of the engagement hook 40 on the side of the second engagement portion 44A and a breakage of the root of the leg 30 where the engagement hook 40 on the side of the second engagement portion 44A is formed are suppressed. In the case where the engagement hook 40 includes the ribs 46, an energy is more effectively absorbed.

Figure 10:
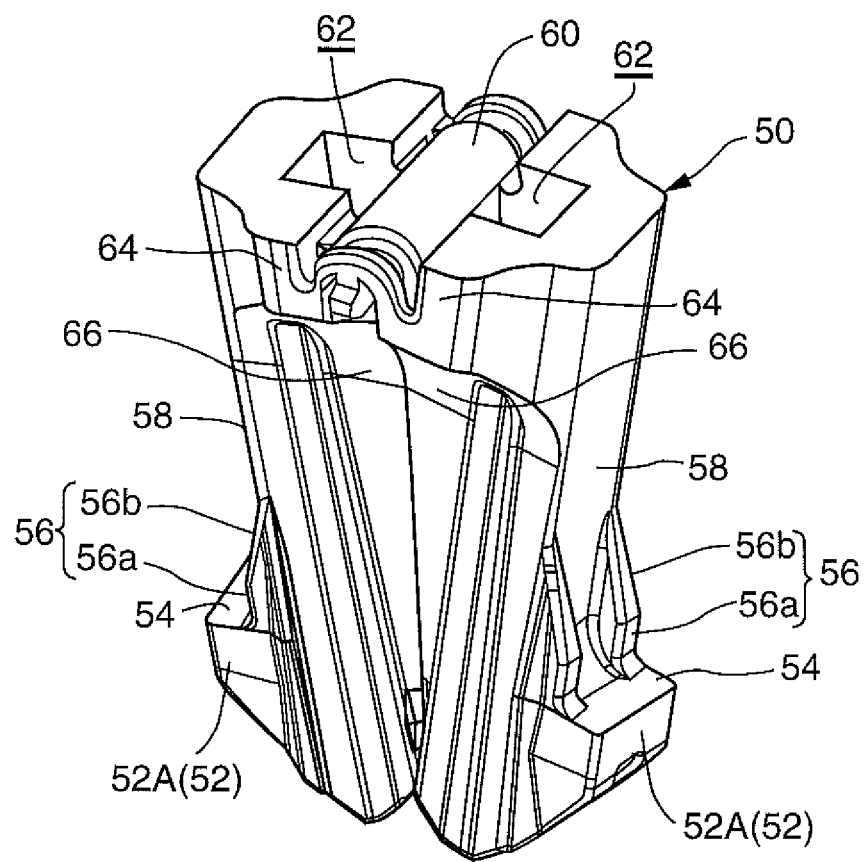
FIG. 10 is a perspective view of a lock pin alone of the fixing clip of FIG. 1 in a state that paired arms each having a side hook formed at an outside surface of each arm are rotated about an arm connecting portion so that tip ends of the paired arms are moved so as to be close to each other.
Figure 11:
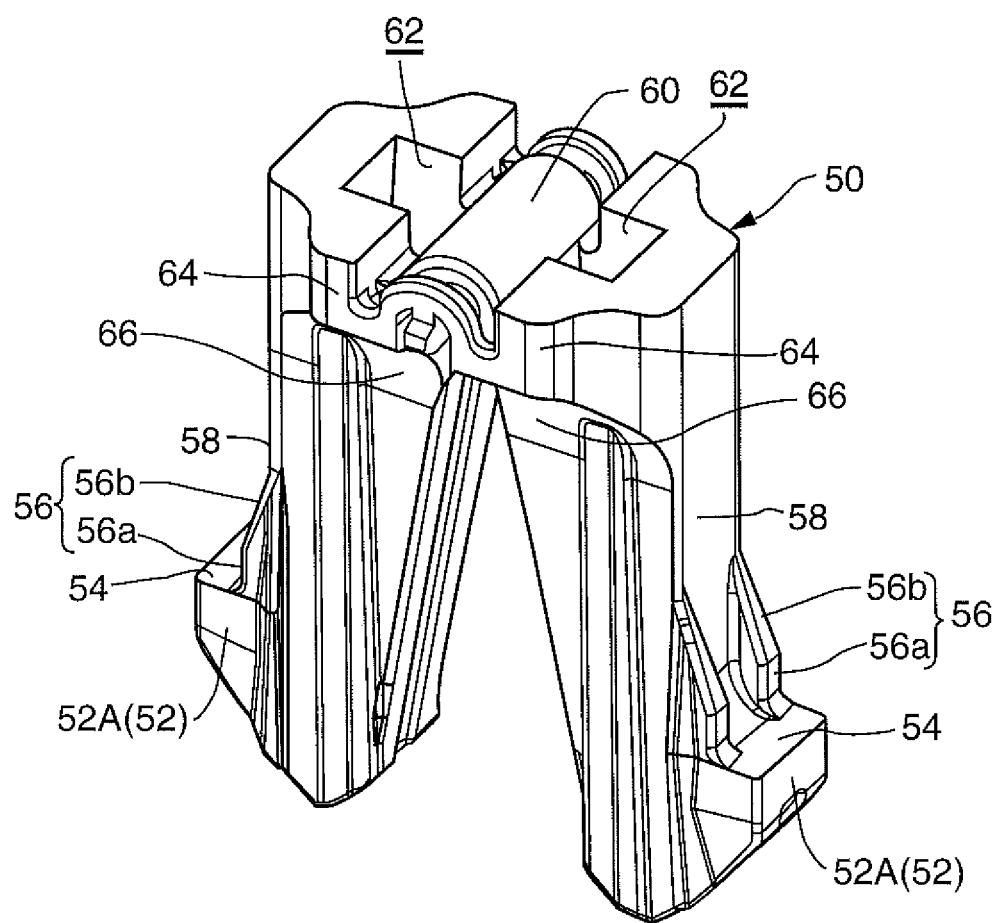
FIG. 11 is a perspective view of the lock pin alone of the fixing clip of FIG. 1 in a state that the tip ends of the paired arms are rotated about the arm connecting portion so that the tip ends of the paired arms move so as to be away from each other.
Figure 12:
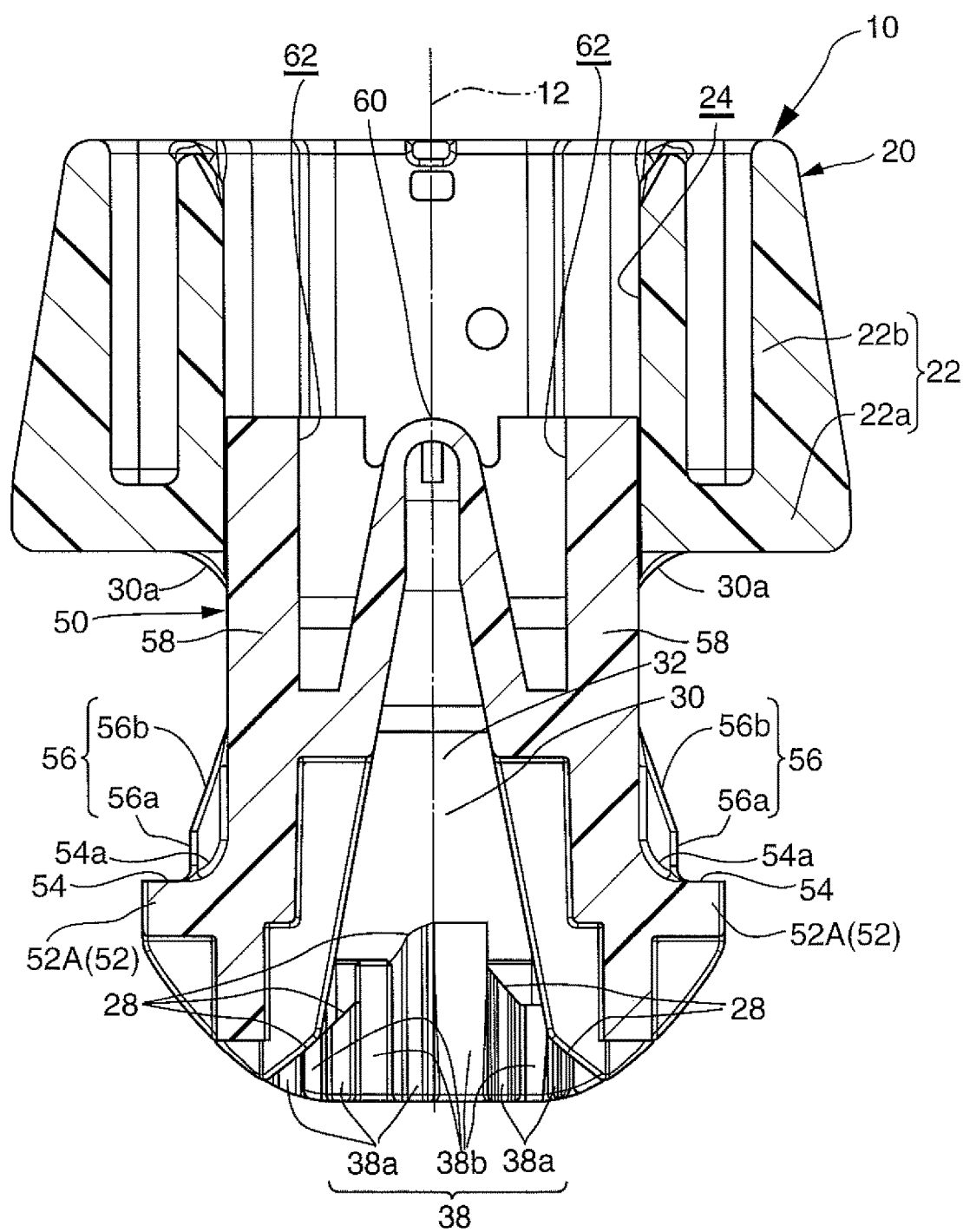
FIG. 12 is a cross-sectional view of the fixing clip of FIG. 3 taken along line 12-12 of FIG. 3.
Figure 13:
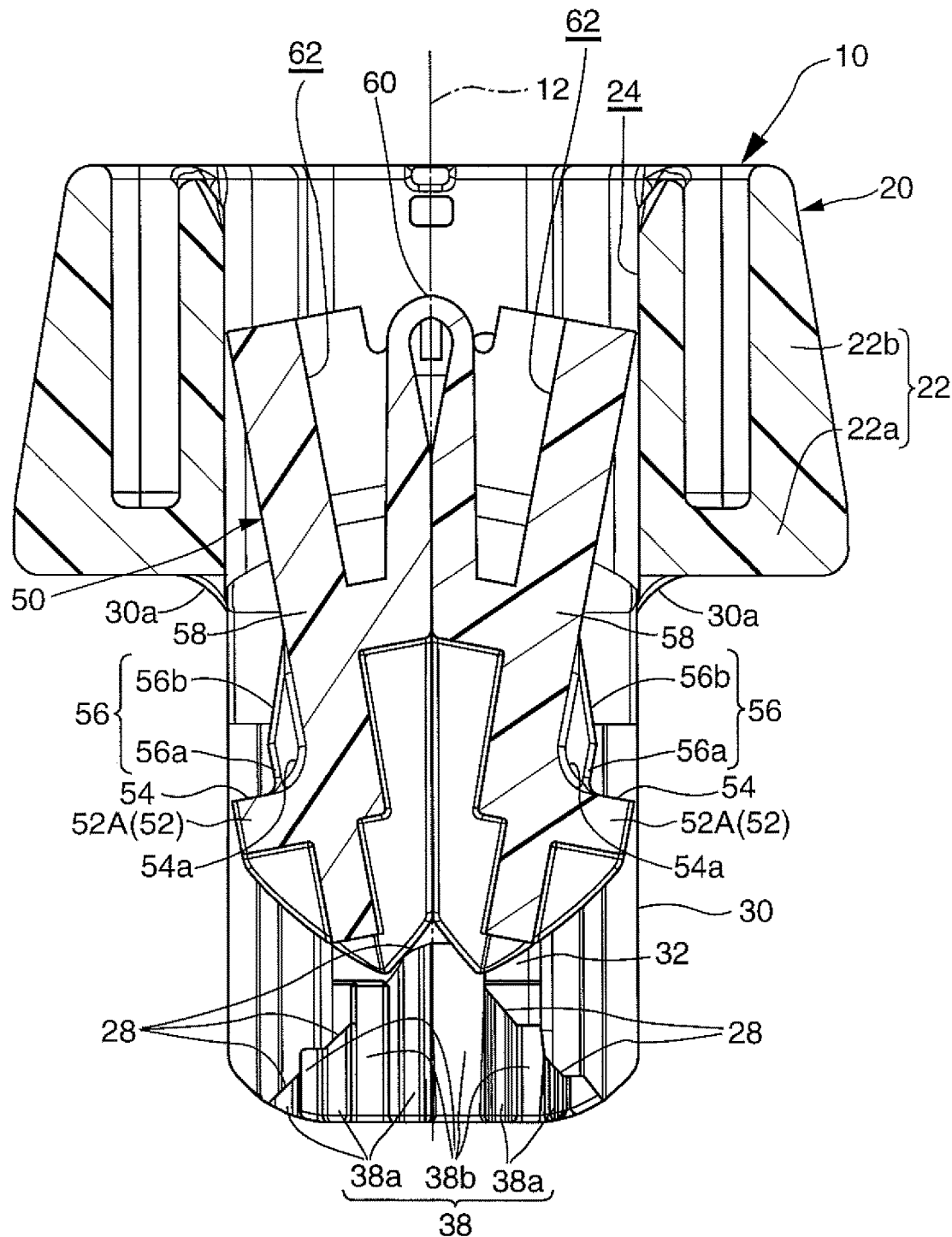
FIG. 13 is a cross-sectional view of the fixing clip of FIG. 12 in a state that the tip ends of the paired arms are rotated about the arm connecting portion so that the tip ends of the paired arms move so as to be close to each other.

As illustrated in FIGS. 1 and 2, the side hook 52A of the lock pin 50 includes the engagement surface 54. The side hook 52A may include a reinforcement rib (which may be called a swell) 56 which rises upward from the engagement surface 54. As illustrated in FIGS. 10 and 11, one or more reinforcement ribs 56 are provided at each of opposite surfaces of the lock pin 50 in the right-left direction Cr1 of the fixing clip. In the embodiment shown, two reinforcement ribs 56 are provided at an outside surfaces of each arm 58 and are spaced from each other.

The engagement surface 54 and its extension extend in the direction perpendicular or substantially perpendicular to the center axis line 12 of the fixing clip.

The engagement surface 54 opposes the head 22 of the bushing 20 in the axial direction of the fixing clip at a state that the lock pin 50 has been inserted into the bushing 20. At the normal operating state where the drawing-out load from the member 94 to be installed is not loaded on the fixing clip 10, the engagement surface 54 is located at a position spaced from the head 22 of the bushing in the axial direction of the fixing clip. When a drawing-out load is loaded on the fixing clip 10 from the member 94 to be installed and the fixing clip 10 is inclined relative to the body panel 90, the engagement surface 54 engages the body panel 90. A portion of the lock pin 50 farther from the head 22 than the engagement surface 54 has a sufficient thickness in the axial direction of the fixing clip so as to endure a reaction force of the drawing-out load when the reaction force is loaded on the engagement surface 54 from the fixing clip aperture 92-defining rim of the body panel 90.

An outside surface of the reinforcement rib 56 in the right-left direction Cr1 of the fixing clip includes a rising surface 56a and an inclined surface 56b. The rising surface 56a rises from the engagement surface 54 toward the head 22 at a position spaced from an outside end of the engagement surface 54 in the right-left direction Cr1 of the fixing clip toward the root of the engagement surface 54. The inclined surface 56b extends from a head-side end of the rising surface 56a in a direction toward the head and toward the center axis line 12 of the fixing clip. A connecting portion between the rising surface 56a and the engagement surface 54 may be a curved surface.

The reinforcing rib 56 is integral with the engagement surface 54, the outside surface of the arm 58 of the lock pin 50 in the right-left direction of the fixing clip, and a curved surface of a corner provided at the root 54a (shown in FIGS. 12 and 14) of the engagement surface 54 and connecting the engagement surface 54 and the outside surface of the arm 58 of the lock pin 50 in the right-left direction of the fixing clip, (The corner is a portion of the root 54a of the engagement surface 54.) As illustrated in FIG. 2, when the drawing-out load F is loaded on the fixing clip 10 from the member 94 to be installed and the fixing clip 10 is inclined relative to the body panel 90, the reinforcing rib 56 and an outside surface portion of the arm located inside the reinforcing rib may or may not be shaved by the edge of the fixing clip aperture 92-defining rim of the body panel 90. In a case where the reinforcing rib 56 and the outside surface portion of the arm located inside the reinforcing rib are shaved, when the fixing clip aperture 92-defining rim of the body panel 90 is brought into contact with the engagement surface 54, the engagement surface 54 may be crushed by the body panel 90 or may be crushed and partially shaved by the edge of the fixing clip aperture 92-defining rim of the body panel 90.

Since the reinforcing rib 56 directly reinforces the root 54a of the engagement surface 54, when a part Fa of the reaction force Fr of the drawing-out load F acts on the side hook 52A, a crack due to a bending moment is prevented or suppressed from being generated at the root 54a of the engagement surface 54. The reinforcing rib 56 acts also as a guide rib for locating the fixing clip 10 at a center of the clip fixing aperture 92 in the right-left direction Cr1 of the fixing clip.

When the drawing-out load F from the member 94 to be installed is loaded on the fixing clip 10 and the fixing clip 10 is being inclined relative to the body panel 90, the reinforcing rib 56 is brought into contact with the clip fixing aperture 92-defining rim of the body panel 90. At that time, the clip fixing aperture 92-defining rim of the body panel 90 is pushed by the reinforcing rib 56 and is deformed to protrude in a direction in which the drawing-out load F acts. A rim portion at which the reinforcing rib 56 contacts the body panel 90 is a short side 92b of the rectangular clip fixing aperture 92-defining rim.

In the case where the reinforcing rib 56 is provided, the corner at the root 54a of the engagement surface 54 which is the corner between the engagement surface 54 and the outside surface of the arm 58 is directly reinforced by the reinforcing rib 56. As a result, when the drawing-out load F is loaded on the fixing clip 10 from the member 94 to be installed, the fixing clip 10 is inclined relative to the body panel 90, and the body panel 90 is brought into contact with the engagement surface 54, a crack is prevented from being generated at the root 54a of the engagement surface 54 whereby the side hook 52A is suppressed from being broken.

Figure 7:
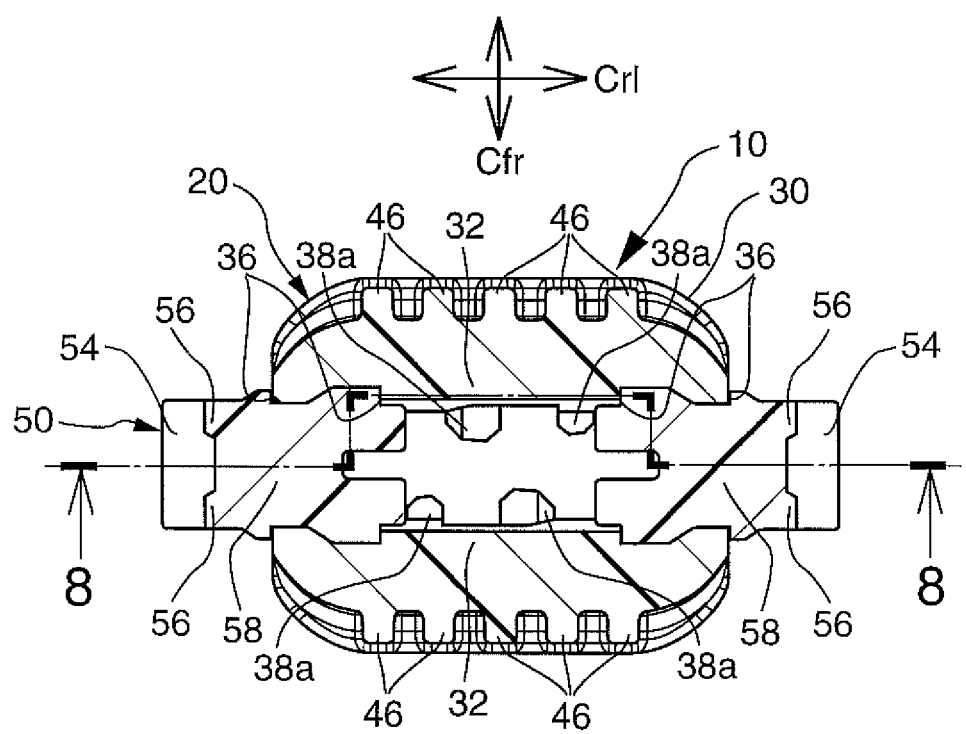
FIG. 7 is a cross-sectional view of a leg of the fixing clip of FIG. 1 taken along a plane perpendicular to a center axis line of the fixing clip (more particularly, taken along line 7-7 of FIG. 8)
Figure 8:
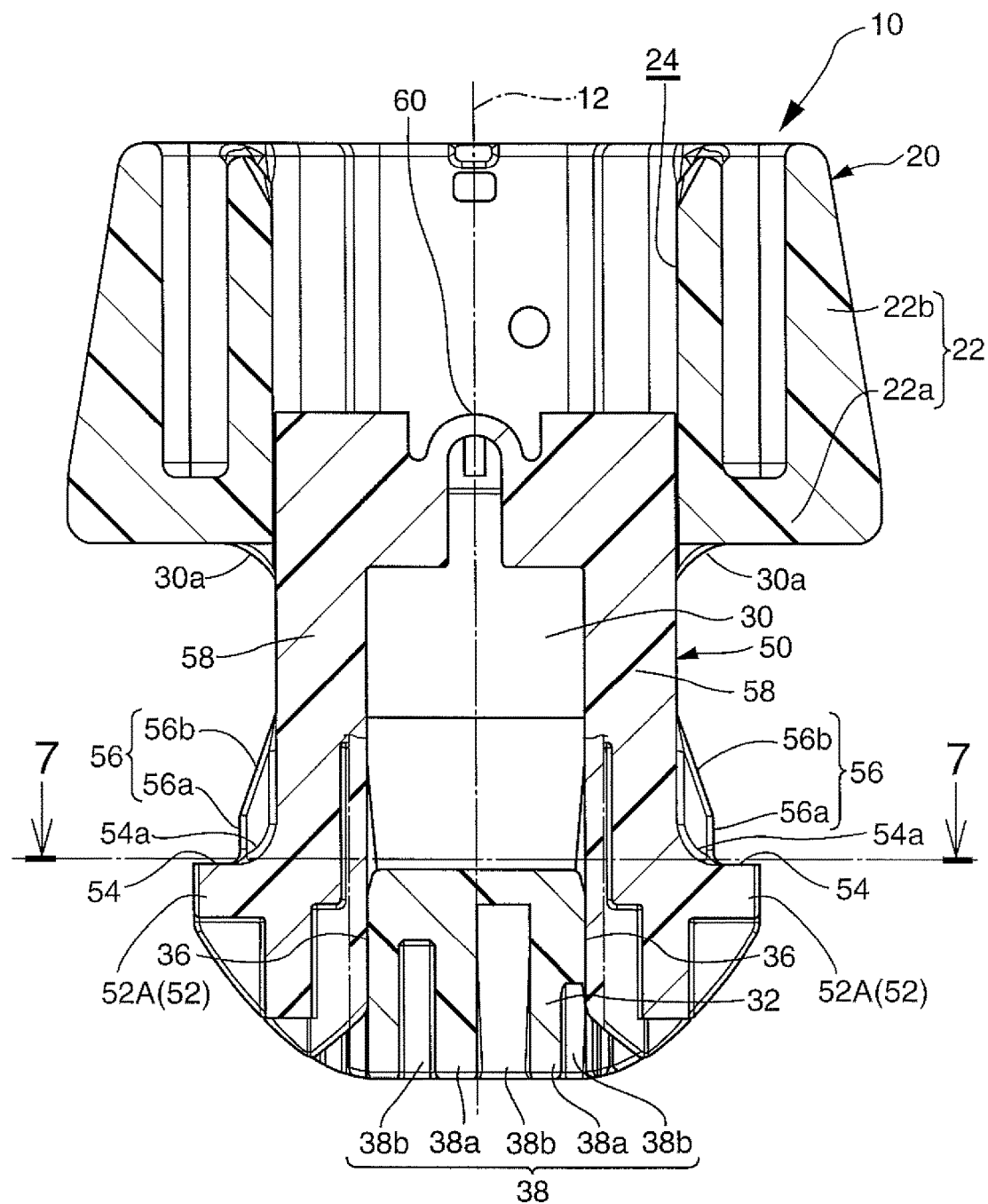
FIG. 8 is a cross-sectional view of the fixing clip taken along line 8-8 of FIG. 7.

As illustrated in FIGS. 7 and 8, a supporting surface 36 is formed at an inside surface of the leg 30 of the bushing 20. The supporting surface 36 supports the side hook 52A (more particularly, the arm 58 at the outside surface of which the side hook 52A is formed) from an inside thereof, thereby preventing the side hooks 52A from being deformed toward the center axis line 12 of the fixing clip. The leg 30 has a protrusion protruding inwardly at an inside surface of each of the opposed portions 32 opposing each other in the front-rear direction Cfr of the fixing clip. The supporting surface 36 is formed at an outside surface of the protrusion in the right-left direction Cr1 of the fixing clip, and at a portion of the outside surface opposing and capable of contacting the inside surface of the side hook 52A (more particularly, the inside surface of the arm 58, at the outside surface of which is formed the side hook 52A is formed).

When the drawing-out load F is loaded on the fixing clip 10 from the member 94 to be installed, the fixing clip 10 is inclined relative to the body panel 90, and the reaction force Fr of the drawing-out load from the body panel 90 acts on the engagement surface 54 of the side hook 52A, the paired side hooks 52A would rotate toward the center axis line 12 of the fixing clip and downward about the connecting portion 60 of the lock pin 50. However, since the side hook 52A is supported from the inside thereof by the supporting surface 36, the side hook 52A cannot rotate. As a result, the side hook 52A can surely receive the reaction force Fr of the drawing-out load added from the clip aperture 92-defining rim.

The paired arms 58 of the lock pin 50 are deformable to rotate about the connecting portion 60 connecting the paired arms 58. When decoupling the fixing clip 10 from the body panel 90 at the time of service, it is necessary to move the lock pin 50 from the deepest position (FIGS. 12 and 16) up to at least the temporary holding position (FIGS. 13 and 17) in a drawing-out direction relative to the bushing 20 thereby rotating the side hook 52A to a position equal to or inside each of opposite outside surfaces in the right-left direction Crl of the fixing clip. In order to make rotational deformation of the side hook 52A easy, the lock pin 50 includes a pair of tool inserting holes 62 provided on opposite sides of the connecting portion 60.

At a time of service, tip ends of a radio pinchers-like tool (not shown) are inserted into the tool-inserting holes 62 of the lock pin 62, and then two handles are gripped so that a distance between the two handles is decreased, whereby the side hooks 52A are elastically displaced inwardly. Then, by drawing the handles upwardly, the lock pin 50 can be moved in the drawing-out direction up to a predetermined position (FIG. 13) of the lock pin inserting hole 24. At the state that the lock pin 50 has been moved to the predetermined position, the engagement hook 40 can be elastically displaced toward the center axis line 12 of the fixing clip. At the state, when the bushing 20 of the fixing clip 10 is drawn by a hand or the tool, the paired engagement hooks 40 of the bushing are pushed by the inside surface of the fixing clip aperture 92-defining rim of the body panel 90 and are displaced toward the center axis line 12 of the fixing clip. As a result, the engagement hooks 40 can pass through the fixing clip aperture 92 so that the fixing clip 10 can be easily removed from the body panel 90. Thus, a serviceability is improved.

The fixing structure 1 is constructed of a fixing structure for fixing the member 94 to be installed to the body panel 90 at the rectangular clip fixing aperture 92, using the fixing clip 10 described above. The member 94 to be installed extends in a longitudinal direction of a vehicle. A longitudinal direction of the member 94 to be installed and a longitudinal axis of a rectangle shape of the clip fixing aperture 92 are directed in the same direction to each other. The fixing clip 10 is coupled to the body panel 90 in a state that the direction perpendicular to the front-rear direction Cfr of the fixing clip (i.e., the right-left direction Crl of the fixing clip) is directed along the longitudinal axis of the rectangle shape of the clip fixing aperture 92. The rectangular clip fixing aperture 92 has a long side 92a and the short side 92b.

In a normal operating condition where the drawing-out load is not loaded on the fixing clip 10 from the member 94 to be installed, the fixing clip 10 is perpendicular to a plane of the body panel 90 and the fixing clip aperture 92-defining rim of the body panel 90 is flat. The fixing clip aperture 92-defining rim of the body panel 90 and the tab 94a of the member 94 to be installed are located between the head 22 of the bushing 20 and the head-side engagement portions 42 of the paired engagement hooks 40. The tab 94a of the member 94 to be installed is pushed against the body panel 90 by an elastic spacer not shown.

When the drawing-out load F is loaded on the fixing clip 10 from the member 94 to be installed, the fixing clip 10 is inclined about the longitudinal axis of the clip fixing aperture 92, and at least one portion of the fixing clip aperture 92-defining rim of the body panel 90 is plastically deformed to protrude in the direction in which the drawing-out load acts. The paired engagement honks 40 engage the edges of the long sides 92a of the clip fixing aperture 92-defining rim of the body panel, and the side hooks 52A engage the edges of the short sides 92b of the clip fixing aperture 92-defining rim of the body panel. At this state, the tab 94a of the member 94 to be installed compresses the elastic spacer and closely or substantially closely contacts a leg-side surface of the seat portion 22a of the head 22.

According to the fixing structure 1 for fixing a member to be installed, since the fixing structure 1 fixes the member 94 to be installed to the body panel 90 using fixing clip 10 increased in endurability against a drawing-out load, the same effects and technical advantages as those of the fixing clip 10 described above can be obtained. As a result, an endurabiliy of the fixing structure 1 against a drawing-out load F at a time when the drawing-out load F is loaded on the fixing clip 10 from the member 94 can be increased. Further, a reliability in strength of the structure 1 is improved.

Second Embodiment

Structures and technical advantages of the first embodiment stated commonly applicable to a second embodiment are applied to the second embodiment also.

In addition to the above structures and technical advantages, the fixing clip 10 and the fixing structure 1 for fixing a member to be installed according to the second embodiment further include the following structures and technical advantages:

As illustrated in FIGS. 18 and 19, in the second embodiment, the lock pin 50 includes a load receiving surface 52B as the load receiving portion 52. The load receiving surface 52B is formed at an outside surface of the lock pin 50 located in the front-rear direction Cfr of the fixing clip 10. The load receiving surface 52B includes a surface inclined in a direction toward the tip of the leg 30 and away from the center axis line 12 of the fixing clip in a state that the lock pin 50 has been inserted into the bushing 20. More particularly, the load receiving surface 52B is constructed from a lower inclined surface of a trapezoidal concavity formed at the outside surface of the lock pin 50 in the front-rear direction Cfr of the fixing clip 10. The trapezoidal concavity includes an upper inclined surface, a bottom surface of the concavity extending in the axial direction of the fixing clip, and the lower inclined surface.

On the other hand, the bushing 20 includes a pushing surface 48 formed at a bushing portion opposing the load receiving surface 52B of the lock pin 50. The bushing 20 includes a trapezoidal protrusion having an upper inclined surface, a top surface of the protrusion extending in the axial direction of the clip and a lower inclined surface. The pushing surface 48 is constructed from the lower surface of the protrusion. The pushing surface 48 pushes the lock pin 50 at the load receiving surface 52B toward the tip of the leg 30 of the bushing 20.

The second embodiment further includes the following structures in addition to the above-described structures:

The paired engagement hooks 40 are formed at the outside surface of the leg 30 so as to be integral with the leg 30 and extend from a leg portion spaced from the head 22 toward the tip of the leg 30.

The second embodiment includes the following effects and technical advantages:

The load receiving portion 52 is constructed from the load receiving surface 52B formed at the lock pin 50 and inclined in the direction toward the tip of the leg 30 and away from the center axis line 12 of the fixing clip. Therefore, when the drawing-out load F acts on the fixing clip 10 from the member 94 to be installed, a part Fa of the drawing-out load F can be received by the load receiving surface 52B of the lock pin 50, by pushing the load receiving surface 52B utilizing the deformation toward the center axis line 12 of the fixing clip and downward, of the engagement hook 40 and the leg 30 caused due to the reaction force Fr of the drawing-out load F. The load Fa received at the load receiving surface 52B of the lock pin 50 is transmitted through the lock pin 50 to the pressure receiving surface 26 of the bushing 20 and is received by the pressure receiving surface 26. Since the load transmitting route from the load receiving surface 52B to the pressure receiving surface 26 passes through the lock pin itself and does not pass through the leg 30 of the bushing 20, a stress generated at the leg 30 of the bushing 20, particularly at the root of the leg 30 is not increased. As a result, the bushing 20 is prevented from being broken at the root of the leg 30.

The second embodiment further includes the following effects and technical advantages in addition to the above-described effects and technical advantages:

More particularly, the above-described effects and technical advantages can be obtained in the fixing clip 10 having the engagement hooks 40 integrally formed at the leg 30 and extending from the side of the head 22 toward the tip of the leg 30 and in the fixing structure for fixing the member 1 to be installed using the fixing clip 10, without providing the side hook 52A.

Third Embodiment

Structures and technical advantages of the first embodiment stated commonly applicable to a third embodiment are applied to the third embodiment also.

In addition to the above structures and technical advantages, the fixing clip 10 and the fixing structure 1 for fixing a member to be installed according to the third embodiment further include the following structures and technical advantages:

As illustrated in FIG. 20, in the third embodiment, the lock pin 50 includes a load receiving surface 52C as the load receiving portion 52. The load receiving surface 52C is formed at an outside surface of the lock pin 50 located in the front-rear direction Cfr of the fixing clip. The load receiving surface 52C includes a surface inclined in a direction toward the tip of the leg 30 and away from the center axis line 12 of the fixing clip in a state that the lock pin 50 has been inserted into the bushing 20.

On the other hand, the bushing 20 includes a pushing surface 48 formed at a bushing portion opposing the load receiving surface 52C of the lock pin 50. The pushing surface 48 pushes the leg 30 of the bushing 20 at the load receiving surface 52C toward the tip of the leg 30 of the bushing 20, when the fixing clip 10 receives the drawing-out load F and a reaction force Fr of the drawing-out load F from the body panel 90 acts on the engagement hook 40.

The third embodiment further includes the following structures in addition to the above-described structures:

Each engagement hook 40 is connected to the opposed portion 32 of the leg 30 at the hook connecting portion 40a and extends from the hook connecting portion 40a toward the head 22. The engagement hook 40 is separated from the opposed portion 32 of the leg 30 by the slit 34 except the hook connecting portion 40a. In the third embodiment, a leg portion which is separated from the leg 30 by the slit 34 except the hook connecting portion 40a and at an outside surface of which the engagement hook 40 is integrally formed is included within the engagement hook 40 and constructs a part of the engagement hook 40. The pushing surface 48 is provided at an inside surface of the engagement hook 40. The pushing surface 48 is formed at a lower surface of a protrusion which protrudes inwardly from the engagement hook 40 toward the center axis line of the clip above the load receiving surface 52C of the lock pin 50.

The third embodiment includes the following effects and technical advantages:

The load receiving portion 52 is constructed from the load receiving surface 52C formed at the lock pin 50 and inclined in the direction toward the tip of the leg 30 and away from the center axis line 12 of the fixing clip. Therefore, when the drawing-out load F acts on the fixing clip 10 from the member 94 to be installed, a part Fa of the drawing-out load F can be received by the load receiving surface 52C of the lock pin 50, by pushing the load receiving surface 52C utilizing the deformation of the engagement hook 40 caused due to the reaction force Fr of the drawing-out load F. The load Fe received at the load receiving surface 52C of the lock pin 50 is transmitted through the lock pin 50 to the pressure receiving surface 26 of the bushing 20 and is received by the pressure receiving surface 26. Since the load transmitting route from the load receiving surface 52C of the lock pin 50 to the pressure receiving surface 26 of the bushing 20 passes through the lock pin itself and does not pass through the leg 30 of the bushing 20, a stress generated at the leg 30 of the bushing 20, particularly at the root of the leg 30 is not increased. As a result, the bushing 20 is prevented from being broken at the root of the leg 30.

Further, when the drawing-out load F acts on the fixing clip 10 from the member 94 to be installed, the reaction force Fr of the drawing-out load F acts on an engagement hook portion between the load receiving surface 62C of the lock pin 50 and the clip fixing aperture 92-defining rim of the body panel 90, of the engagement hook 40 located on a side (i.e., a left-half side of FIG. 20) opposite a side where the drawing-out load F acts with respect to the center axis line 12 of the fixing clip. The reaction force changes from a shear force acting so as to shave the engagement hook portion by the edge of the clip fixing aperture 92-defining rim, to a compression force acting between an inner surface of the clip fixing aperture 92-defining rim of the body panel and the load receiving surface 52C. Therefore, that engagement hook 40 is unlikely to be broken. As a result, the paired engagement hooks 40 are prevented from being broken at the same time with each other, so that the fixing clip 10 is suppressed or prevented from dropping off from the body panel 90.

Although several embodiments have been described in detail above, those skilled in the art will appreciate that various modifications and alterations can be made to the particular embodiments shown without materially departing from the novel teachings and advantages of the present disclosure.

What is claimed is:

1. A fixing clip for fixing a member to a body panel, the fixing clip comprising:
   a bushing including a head having a lock pin inserting hole, a leg, and paired engagement hooks provided at opposed portions of the leg located on opposite sides of a center axis line of the fixing clip and opposing each other; and a lock pin that is insertable into the bushing, wherein the lock pin includes a load receiving portion where, in a state that the lock pin has been inserted to a deepest position of the lock pin inserting hole, when a drawing-out load is loaded on the fixing clip from the member and a reaction force of the drawing-out load is applied to the fixing clip from the body panel, the lock pin receives one part of the reaction force of the drawing-out load, the lock pin includes a pair of side hooks which, in a state that the lock pin has been inserted into the bushing, protrudes outward more than a side surface of the leg of the bushing in a direction perpendicular to a direction connecting the paired engagement hooks and perpendicular to the center axis line of the fixing clip, the bushing includes, at the head, a pressure receiving surface where the bushing receives the one part of the reaction force of the drawing-out load which the lock pin has received, a remaining part of the reaction force, other than the one part of the reaction force, is transmitted through a connecting portion of the leg to the head of the bushing, the opposed portions of the leg are connected to the head at first ends of the opposed portions of the leg and extend in a direction away from the head and end at second ends of the opposed portions, each of the paired engagement hooks is integrally formed to an outside surface of each of the opposed portions of the leg, and a head-side engagement portion of each of the paired engagement hooks is spaced from the head, and the fixing clip engages the body panel at the paired engagement hooks when the drawing-out load is loaded on the fixing clip from the member and the fixing clip has been inclined relative to the body panel along a plane extending in a front-rear direction of the fixing clip which corresponds to the direction connecting the paired engagement hooks.

2. The fixing clip according to claim 1, wherein the pressure receiving surface of the bushing, except for an end portion of the pressure receiving surface located on a side closest to the center axis line of the fixing clip and extending into the leg, is located inside the head of the bushing.

3. The fixing clip according to claim 1, wherein in a state that the lock pin has been inserted into a space provided between the paired engagement hooks of the bushing, the pair of side hooks (i) is located along a plane extending in the direction perpendicular to the direction connecting the paired engagement hooks and perpendicular to the center axis line of the fixing clip and (ii) is located closer to a leg tip-side engagement portion than the head-side engagement portion of the paired engagement hooks.

4. The fixing clip according to claim 1, wherein when the drawing-out load is loaded on the fixing clip from the member so that the fixing clip is inclined relative to the body panel and engages the body panel at a first engagement portion and a second engagement portion whose distances from the head are different from each other, the first engagement portion is located closer to the head than the pair of side hooks and the second engagement portion is located closer to a tip of the leg than the pair of side hooks.

5. The fixing clip according to claim 1, wherein the pair of side hooks includes an engagement surface opposing the head and a reinforcement rib which rises toward the head from the engagement surface and reinforces a root portion of the engagement surface.

6. The fixing clip according to claim 1, wherein a support surface for preventing the pair of side hooks from being deformed toward the center axis line of the fixing clip is formed at an inside surface of each of the opposed portions of the leg.

7. The fixing clip according to claim 1, wherein the lock pin includes (1) a pair of arms each having an outside surface where one of the side hooks of the pair of side hooks is formed, (2) an arm connecting portion rotatably connecting the pair of arms in an opposing direction of the pair of arms, and (3) tool inserting holes formed at the pair of arms on opposite sides of the arm connecting portion.

8. The fixing clip according to claim 1, wherein a guide surface is formed at an inside surface of each of the opposed portions of the leg of the bushing, the guide surface being constructed from an inclined surface which is brought into sliding-contact with the lock pin when the lock pin is inserted into the deepest position of the lock pin inserting hole thereby enlarging a span between the pair of side hooks and moving the pair of side hooks to a position where the pair of side hooks can engage the body panel.

9. The fixing clip according to claim 1, wherein the lock pin includes a load receiving surface which is provided at a lock pin portion located along a plane extending in the direction connecting the paired engagement hooks in a state that the lock pin has been inserted into the bushing and is inclined so as to extend in a direction toward a tip of the leg and away from the center axis line of the fixing clip, the load receiving surface defining the load receiving portion, and the bushing includes a pushing surface formed at a bushing portion opposing the load receiving surface of the lock pin, the pushing surface pushing the lock pin toward the tip of the leg at the load receiving surface when the fixing clip receives the drawing-out load from the member.

10. The fixing clip according to claim 9, wherein the pushing surface is provided at an inside surface of each of the opposed portions of the leg.

11. The fixing clip according to claim 9, wherein (i) each of the paired engagement hooks of the leg is connected to each of the opposed portions of the leg at a hook connecting portion and is separated from the leg except at the hook connecting portion, (ii) each of the paired engagement hooks extends toward the head from the hook connecting portion, and (iii) the pushing surface is provided at an inside surface of each of the paired engagement hooks.

12. A fixing structure for fixing the member to the body panel at a rectangular clip fixing aperture, the fixing structure comprising:

the fixing clip according to claim 1, coupled to the body panel so that the direction perpendicular to the direction connecting the paired engagement hooks is parallel to a long axis of the rectangular clip fixing aperture, wherein in a normal operating condition of the member where the drawing-out load no acts on the fixing clip from the member, (a) the center axis line of the fixing clip is perpendicular to the body panel, (b) a clip fixing aperture-defining rim of the body panel is flat, and (c) the clip fixing aperture-defining rim of the body panel and a tab of the member are located between the head and the paired engagement hooks of the bushing, and in a condition where the drawing-out load generating a moment at a root of the leg acts on the fixing clip from the member, (A) the fixing clip is inclined about the long axis of the clip fixing aperture, and (B) at least a portion of the clip fixing aperture-defining rim of the body panel is plastically deformed so as to protrude in a drawing-out load acting direction.

\* \* \* \* \*